(12) United States Patent
Itskovich et al.

(10) Patent No.: US 10,739,486 B2
(45) Date of Patent: Aug. 11, 2020

(54) DETERMINATION OF DISPERSIVE RESISTIVE AND DIELECTRIC PROPERTIES OF EARTH FORMATIONS USING MULTI-FREQUENCY MEASUREMENTS

(71) Applicant: Baker Hughes, a GE company, LLC, Houston, TX (US)

(72) Inventors: Gregory Boris Itskovich, Houston, TX (US); Marina Nikolaevna Nikitenko, Novosibirsk (RU); Alexander Viktorovich Seryakov, Novosibirsk (RU); Yinxi Zhang, Richmond, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 127 days.

(21) Appl. No.: 16/146,081

(22) Filed: Sep. 28, 2018

(65) Prior Publication Data
US 2019/0094405 A1 Mar. 28, 2019

(51) Int. Cl.
*G01V 3/10* (2006.01)
*G01V 3/28* (2006.01)
*G01V 3/38* (2006.01)

(52) U.S. Cl.
CPC ............... *G01V 3/10* (2013.01); *G01V 3/28* (2013.01); *G01V 3/38* (2013.01)

(58) Field of Classification Search
CPC .. G01R 31/311; G01R 31/2656; G01R 1/071; G01R 31/2635; G01R 31/31728; H01L 21/681; H01L 31/0232
(Continued)

(56) References Cited

U.S. PATENT DOCUMENTS

| 3,774,237 | A | | 11/1973 | Hardway |
| 4,072,200 | A | * | 2/1978 | Morris ...................... E21B 7/04 175/45 |
| 4,899,112 | A | | 2/1990 | Clark et al. |
| 4,933,640 | A | * | 6/1990 | Kuckes ............. E21B 47/02216 166/66.5 |

(Continued)

OTHER PUBLICATIONS

Fuller and Ward, Linear Linear System Description of the Electrical Parameters of Rocks, IEEE Transactions on Geoscience Electronics, vol. GE 8, No. 1, Jan. 1970.

(Continued)

*Primary Examiner* — Giovanni Astacio-Oquendo
(74) *Attorney, Agent, or Firm* — Mossman Kumar & Tyler PC

(57) ABSTRACT

Methods and apparatus for determining geo-electrical parameters of an earth formation. Methods include operating a multi-frequency electromagnetic propagation instrument at at least three frequencies; generating synthetic signals of the propagation instrument for a set of models and a set of operating frequencies; perform a 2-dimensional interpolation of the synthetic signals; using first polynomial functions to perform interpolation of the dispersive resistivity; using second polynomial functions to perform interpolation of the dispersive dielectric constant; and performing a multi-parametric scan over the sets of at least 2 resistivity parameters and sets of at least 3 dielectric constant parameters using a multi-dimensional grid of resistivity and dielectric constant values, 2-dimensional interpolation, first polynomial functions, and second polynomial functions to find a combination of first polynomial coefficients and second polynomial coefficients which describe dispersive resistivity and dielectric constant providing a best fit between measured and synthetic data.

19 Claims, 15 Drawing Sheets

(58) Field of Classification Search
USPC ....... 324/97, 750.23, 750.27, 754.21–754.31
See application file for complete search history.

(56) References Cited

U.S. PATENT DOCUMENTS

| | | | |
|---|---|---|---|
| 4,996,489 | A | 2/1991 | Sinclair |
| 5,081,419 | A | 1/1992 | Meador et al. |
| 5,666,057 | A | 9/1997 | Beard et al. |
| 5,811,973 | A | 9/1998 | Meyer, Jr. |
| 6,788,066 | B2 | 9/2004 | Wisler et al. |
| 2002/0062992 | A1* | 5/2002 | Fredericks .............. E21B 47/00 175/40 |
| 2014/0019049 | A1 | 1/2014 | Dorovsky et al. |
| 2017/0102479 | A1 | 4/2017 | Kouchmeshky et al. |

OTHER PUBLICATIONS

M Pirrone et al., An Innovative Dielectric Dispersion Measurement for Better Evaluation of Thin Layered Reservoirs Applied in a South Italy Well 11, 10ZH Offshore M Mediterranean Conference and Exhibition, A Mar. 23, 2011 (Mar. 23, 2011).

M. Hizem, H. Budan, B. Devine, O. Faivre, L. Mosso, and M. Simon, "Dielectric Dispersion: A New Wireline Petrophysical Measurement", SPE Annual Technical Conference and Exhibition, USA, 2008.

N. Seleznev, T. Habashy, A. Boyd, and M. Hizem, "Formation properties derived from a multi-frequency dielectric measurement", SPWLA 47th Annual Logging Symposium, 2006.

Mohamed Mahmoud Gomaa: "Relation between electric properties and water saturation for hematitic sandstone with frequency", Annals of geophysics, vol. 51, Oct. 1, 2008 (Oct. 1, 2008).

Klein, Swift "An Improved Model for the Dielectric Constant of Sea Water at Microwave Frequencies." IEEE Transactions of Antennas and Propagation, 1978.

PCT Application No. PCT/RU2017/000709, International Search Report dated Jun. 19, 2018.

Rau and Warton, Measurement of Core Electrical Parameters at Ultrahigh and Microwave Frequencies, Journal of Petroleum Technology, Nov. 1982, pp. 2689-2700.

* cited by examiner

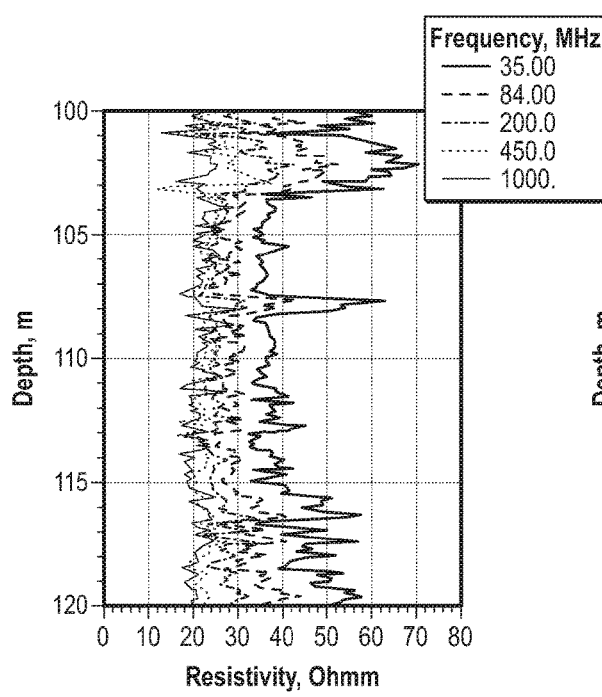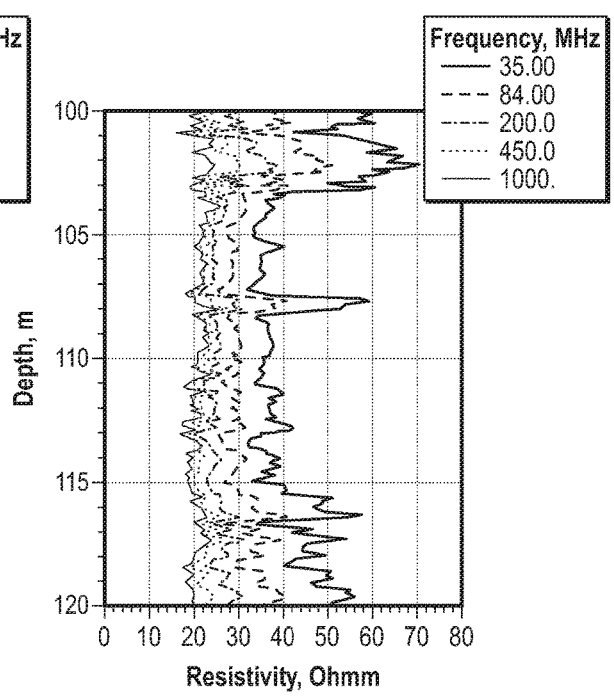
FIG. 13A
FIG. 13B

DETERMINATION OF DISPERSIVE RESISTIVE AND DIELECTRIC PROPERTIES OF EARTH FORMATIONS USING MULTI-FREQUENCY MEASUREMENTS

CROSS-REFERENCE OF RELATED APPLICATIONS

This application is a continuation-in-part of PCT Application No. PCT/RU2017/000709, filed on Sep. 28, 2017, and claims the benefit of priority from the aforementioned application, the disclosure of which is incorporated herein by reference in its entirety.

FIELD OF THE DISCLOSURE

This disclosure generally relates to exploration and production of hydrocarbons involving electromagnetic (EM) investigations of regions of an earth formation penetrated by a borehole. More specifically, the disclosure relates to finding resistive and dielectric properties of formation using multi-frequency EM measurements.

BACKGROUND OF THE DISCLOSURE

Electrical earth borehole logging is well known and various devices and various techniques have been described for this purpose. Broadly speaking, there are two categories of electrical logging apparatus. In the first category, that of galvanic type, one or more source/receiver electrodes are used in conjunction with a return electrode, which might be a logging tool's body or mandrel. In a second category, that of inductive measuring tools, an antenna within the measuring instrument induces electrical field within the earth formation, resulting in a signal response at either the same or a separate receiver antenna. In both cases the measured responses are affected by properties of the earth formation including electrical conductivity, magnetic permeability, and dielectric permittivity and thus, affected by the pore volume or porosity of the rock matrix, and water saturation.

Parameters of the formation, such as, for example, resistivity or dielectric constant, may be estimated by transmitting an electromagnetic (EM) wave into the formation, and receiving EM response at one or more receivers (e.g., at receiver antennas). The attenuation and phase shift between spaced receivers may be determined and used to estimate the complex dielectric constant of the formation.

SUMMARY OF THE DISCLOSURE

In aspects, the present disclosure is related to methods, apparatus, and products for determining at least one parameter of interest of an earth formation intersected by a borehole, such as a geo-electrical parameter. Methods include operating a multi-frequency electromagnetic propagation instrument at at least three frequencies by energizing at least one transmitter of the instrument to induce currents in the formation, the formation possessing dispersive resistivity and dispersive dielectric constant, and receiving electromagnetic signals induced by the formation; generating a 2-dimensional grid of a plurality of values of formation resistivity in a first selected range and a plurality of values of dielectric constant in a second selected range, with the first dimension of the grid being a resistivity of the formation and the second dimension of the grid being a dielectric constant of the formation; using at least one computing unit to: i) generate a lookup table of synthetic signals of the propagation instrument for a set of models whose formation resistivities and dielectric constants are defined in nodes of said 2-dimensional grid and a set of operating frequencies; and ii) perform a 2-dimensional interpolation of the synthetic signals from the lookup table, where the first dimension is resistivity and the second dimension is dielectric constant; defining first polynomial functions interpolating a logarithm of the dispersive resistivity of the formation and second polynomial functions interpolating a logarithm of the dispersive dielectric constant of the formation; generating a multi-dimensional grid comprising a first number of first polynomial coefficients of said first polynomial functions and a second number of second polynomial coefficients of said second polynomial functions; using said first polynomial functions to perform interpolation of the dispersive resistivity using the first number of first polynomial coefficients describing resistivity values from the said multi-dimensional grid; using said second polynomial functions to perform interpolation of the dispersive dielectric constant using the second number of second polynomial coefficients from said multi-dimensional grid; and performing a multi-parametric scan over the sets of at least 2 resistivity parameters and sets of at least 3 dielectric constant parameters using the multi-dimensional grid, 2-dimensional interpolation, first polynomial functions, and second polynomial functions to find a combination of first polynomial coefficients and second polynomial coefficients which describe dispersive resistivity and dielectric constant providing a best fit between measured and synthetic data. The first polynomial functions may be linear functions, the second polynomial functions may be quadratic functions, the first number may be 2, the second number may be 3, and the multi-dimensional grid may be a 5-dimensional grid.

Methods include using the combination to estimate a property of the formation. The property may be at least one of: i) a frequency dependent conductivity parameter; and ii) a frequency dependent permittivity parameter. The set of models may comprise non-petrophysical models. Defining first polynomial functions interpolating a logarithm of the dispersive resistivity of the formation may include interpolating logarithms of the dispersive resistivity as a function of a logarithm of the operating frequency with a negative slope; and defining second polynomial functions interpolating a logarithm of the dispersive dielectric constant of the formation may include interpolating logarithm of the dispersive dielectric constant as a function of a logarithm of the operating frequency with the vertex of the quadratic functions being the lowest point on a U-shape graph and the vertex of the quadratic functions being greater than maximal operating frequency.

Methods may include using the combination to estimate at least one geo-electric parameter of the formation. Methods may include representing the estimated at least one geo-electric parameter as a dispersive relation for calculated permittivity values and conductivity values of the formation. Methods may include conducting further operations in dependence upon the at least one geo-electric parameter. The further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

Other methods may include operating a multi-frequency electromagnetic propagation instrument at at least three frequencies; generating synthetic signals of the propagation instrument for a set of models and a set of operating frequencies; perform a 2-dimensional interpolation of the synthetic signals; using first polynomial functions to perform interpolation of the dispersive resistivity; using second polynomial functions to perform interpolation of the dispersive dielectric constant; and performing a multi-parametric scan over the sets of at least 2 resistivity parameters and sets of at least 3 dielectric constant parameters using a multi-dimensional grid of resistivity and dielectric constant values, 2-dimensional interpolation, first polynomial functions, and second polynomial functions to find a combination of first polynomial coefficients and second polynomial coefficients which describe dispersive resistivity and dielectric constant providing a best fit between measured and synthetic data.

Other methods may include operating a multi-frequency electromagnetic propagation instrument at at least three frequencies; generating synthetic signals of the propagation instrument for a set of models and a set of operating frequencies; using first polynomial functions to perform interpolation of the dispersive resistivity; using second polynomial functions to perform interpolation of the dispersive dielectric constant; and performing a parametric scan over sets of at least 2 resistivity parameters and sets of at least 3 dielectric constant parameters using first polynomial functions, and second polynomial functions to find a combination of first polynomial coefficients and second polynomial coefficients which describe dispersive resistivity and dielectric constant providing a best fit between measured and synthetic data.

Apparatus embodiments may include a carrier configured for conveyance in a borehole and having disposed thereon a multi-frequency electromagnetic propagation instrument with at least one transmitter and at least one receiver; and at least one computing unit, including at least one processor. Apparatus embodiments may include at least one processor and a computer memory accessible to the at least one processor comprising a computer-readable medium having instructions thereon that, when executed, causes the at least one processor to perform methods described above.

Some embodiments include a non-transitory computer-readable medium product accessible to the processor and having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 13A & 13B illustrate effects of the polynomial techniques in accordance with embodiments of the present disclosure.

DETAILED DESCRIPTION

Figure 1A:
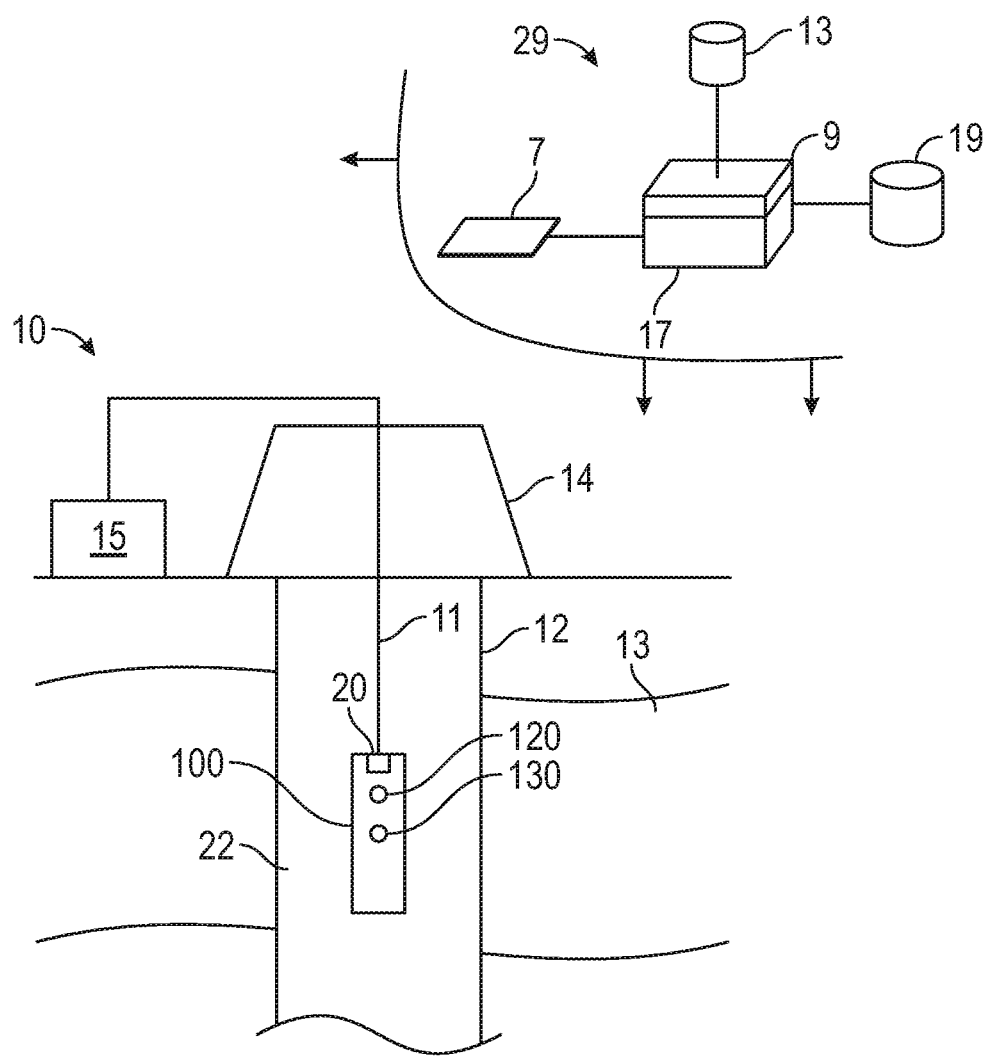
FIG. 1A shows an exemplary embodiment of a system for evaluation of an earth formation using measurements from a downhole electromagnetic tool.

This disclosure generally relates to exploration for hydrocarbons involving electromagnetic investigations of a borehole penetrating an earth formation. These investigations may include estimating at least one parameter of interest of the earth formation, such as, for example, a resistivity parameter, dielectric permittivity, and the like. New techniques in processing of EM signals improve tool functionality, as described below.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Methods of finding resistive and dielectric properties of formation using multi-frequency electromagnetic (EM) measurements are disclosed herein. Example methods include taking EM measurements using at least two symmetrically placed induction transmitters and at least two symmetrically placed induction receivers and combining them to derive attenuation and phase differences. The measurements are subject to inversion, aimed at finding dispersive resistivity and dielectric constant of the formation by providing the best match between measured (actual) data and synthetic (simulated) data. The synthetic data are generated using 2-dimensional interpolation and sets of linear and quadratic functions approximating a dispersive character of resistive and dielectric properties of the formation.

The present disclosure relates to methods used to translate electrical measurement information into measured property values for the formation wherein the electrical measurement was conducted. One of these properties is known as dispersion, which is variation of electrical properties with frequency.

Dielectric permittivity may arise in sedimentary rock from the ability of electric dipoles to align themselves with an alternating electromagnetic field, such as one induced by a downhole tool. Several phenomena contribute to $\varepsilon_r$ in a porous earth formation. One contribution is the rotation of dipolar molecules (e.g., water). In the presence of an applied electric field, a dipolar molecule will rotate to align the positive and negative poles of the molecule with the applied electric field. In such an alternating field, the molecule will rotate constantly with the variation in polarity of the applied field. While the molecule is in rotation to align with the applied field, the movement of the charge represents electrical charges moving in phase with the applied field and are therefore carrying current and contributing to the composite formation conductivity. Once aligned with the field, the polarized molecules represent fixed or stored charges and thereby contribute to the formation permittivity until the polarity of the alternating applied field is reversed. At this time, the molecules again rotate contributing again to composite formation conductivity. The motions of ions also contribute, compounding these effects.

Measured values of $\varepsilon_r$ are dependent upon the frequency of the applied field. There are three physical phenomena contribute into dielectric permittivity:

a) electronic polarization ('rock permittivity');
b) molecular polarization ('molecule orientation');
c) interfacial polarization due to charges at the boundaries of fluid-saturated porous matrix (Maxwell-Wagner effect).

At low frequencies, measured dielectric constants can be quite high since the water molecules can easily rotate and align themselves with the field before the polarity of the field reverses. Similarly, dissolved ions can migrate to the boundary of the pore space and accumulate against the pore wall long before the polarity of the field reverses. Therefore, at low frequencies, molecules spend most of the AC cycle in a fixed orientation or position and only a small fraction of the time moving.

At high frequencies, the polarity of the applied field will reverse before mobile charges come to rest. In this situation, the mobile charges spend most of their time moving in phase with the external electromagnetic field, thereby increasing the conductivity and resulting in a lower measured dielectric constant. This phenomenon of changing apparent dielectric and conductivity values with frequency is known as dispersion.

Multi-frequency tools aimed to study dispersive resistivity and dielectric constant of formation have been known for some time. See M. Hizem, H. Budan, B. Devine, O. Faivre, L. Mosso, and M. Simon, "Dielectric Dispersion: A New Wireline Petrophysical Measurement", SPE Annual Technical Conference and Exhibition, USA, 2008.

Logs of dispersive resistivity and dielectric constant may be used to determine various downhole properties and relationships relating to at least: pore-fluid analysis from multiple-spacing high frequency measurements; matrix analysis from dielectric dispersion; and geological structure analysis from the multi-polarizations.

Traditionally, to derive all these characteristics, an inversion is conducted in two steps: electromagnetic inversion (EI) and followed by petro-physical inversion (PI) at each logging depth. An electromagnetic model relates the formation properties, both electromagnetic and geometric, to measured attenuation and phase shifts. At the second step a petro-physical inversion is performed to relate the electromagnetic properties to the petro-physical parameters, such as the water saturation, water conductivity and rock textural parameters. To conduct the petro-physical inversion, various different mixing laws can be used. See N. Seleznev, T. Habashy, A. Boyd, and M. Hizem, "Formation properties derived from a multi-frequency dielectric measurement", SPWLA 47th Annual Logging Symposium, 2006.

The present disclosure includes methods of electromagnetic inversion producing results maximally suitable for the following petro-physical inversion. Methods herein may use polynomial functions (in particularly, linear and quadratic functions) to interpolate dispersive resistivity and dielectric constant values to find a model which provides the best fit to the measurements. The derived interpolants allow estimation of resistivity and dielectric constant in a wide range of frequencies and facilitate utilization of a wide range of mixing laws in the following petro-physical inversion.

Aspects of the invention include a multi-parametric inversion (e.g., five parameters), the parameters representing polynomial coefficients describing dispersive resistivity and dielectric constant. In particular, two coefficients may approximate linear dispersive resistivity and three coefficients may approximate quadratic dispersive dielectric constant. Both linear and quadratic functions may be defined in bi-logarithmic scale, with logarithm of frequency used as the independent variable with respect to the function of logarithm of resistivity and the function of dielectric constant.

One aspect of the invention is determining a dispersive resistivity and dielectric constant of the formation from the measurements performed with a multi-frequency dielectric tool. This determination may be achieved via multi-frequency measurements and a multi-parametric inversion. In particular, it can be five-parametric inversion with two parameters describing linear dispersive resistivity and three parameters describing quadratic dispersive dielectric constant.

Inversion of geophysical data relates to estimating properties of a volume of the formation from the acquired data. Mathematically, this estimation is carried out through a process of finding a model which provides the best fit between measurements and synthetic data. Since nearly all the data are subject to some uncertainty, these inferences are usually statistical. Further, since one can only record a limited number of data points, no geophysical inverse problems are uniquely solvable: if there is a single model that fits the data there will be infinity of them. Thus, the set of models may be characterized in order to fit the data and satisfy a priori information. To a large extent the possibility to reduce the range of uncertainty in the inverted models is driven by the sensitivity of the data to the parameters of interest. Increasing the sensitivity may be accomplished by reducing noise in the measurements. This is one reason a symmetrical arrangement for the propagation-type devices may be used, which effectively reduces systematic noise caused by the tool electronics.

It is important to use synthetic model that adequately represent the measurements. For example, if some parameters of the model are known or have very little variation (for example, magnetic permeability) the parameters should not be subject for inversion for most applications. In other words, the inversion model, used to fit the data, usually should be comprised of parameters that produce measurable effect on the data. Herein below, we provide an example of reasoning for selection of a dispersive formation model.

As described above, measured values of $\varepsilon_r$ are dependent upon the frequency of the applied field. There are three physical phenomena contribute into dielectric permittivity:
 a) electronic polarization ('rock permittivity');
 b) molecular polarization ('molecule orientation');
 c) interfacial polarization due to charges at the boundaries of fluid-saturated porous matrix (Maxwell-Wagner effect).

In the frequency range of 1-1000 MHz all three phenomena affects complex dielectric value. Polarization vector and displacement vector are connected through Maxwell equation:

$$\vec{D} = \varepsilon_0 \vec{E} + \vec{P} = \varepsilon_0 \varepsilon_r \vec{E}, \quad (1)$$

where $\varepsilon_r = (1 + \chi_e)$ is the relative permittivity (real number) and $\chi_e$ is the susceptibility $\vec{P} = \varepsilon_0 \chi_e \vec{E}$.

Displacement vector $\vec{D}$ and current density $\vec{j}$ are governed by the equation:

$$rot\vec{H} = \frac{d\vec{D}}{dt} + \vec{j}, \quad (2)$$

here $\vec{j} = \sigma \vec{E}$.

For harmonic regime ($i\omega$) we have:

$$rot\vec{H} = i\omega\varepsilon_0\left(\varepsilon_r - i\frac{\sigma}{\omega\varepsilon_0}\right)\vec{E} = i\omega\varepsilon_0\varepsilon^*\vec{E} \quad (3)$$

where $$\varepsilon^* = \left(\varepsilon_r - i\frac{\sigma}{\omega\varepsilon_0}\right) = \varepsilon' - i\varepsilon''$$

is called complex relative permittivity.

From $rot\vec{E} = i\omega\mu\vec{H}$ and (3) we can further derive:

$$rot(rot\vec{E}) = -i\omega\mu rot(\vec{H}) = -i\omega\mu \cdot i\omega\varepsilon_0\varepsilon^*\vec{E} = \mu\omega^2\varepsilon_0\varepsilon^*\vec{E},$$

which describes propagation with the wave number:

$$k = \sqrt{\mu\omega^2\varepsilon_0\varepsilon^*} = \omega\sqrt{\mu\varepsilon_0(\varepsilon_r - i\sigma/\omega\varepsilon_0)}.$$

There are several dispersion models which may be used to explain dispersive behavior of formation resistivity and dielectric constant. One of these is the CRIM model. At frequencies of the order of 1 GHz and higher, the permittivity responds mainly to water volume, whereas at frequencies of 100 MHz and below the permittivity responds not only to water volume but also to interfacial polarization related to the rock texture.

One can say that at 1 GHz the response is mostly volumetric with respect to the elements and that the propagation constant of the rock, water and oil mixture can be related to its constituents as follows:

$$\sqrt{\varepsilon^*_{Formation}} = (1-\Phi)\sqrt{\varepsilon_{Matrix}} + S_W\Phi\sqrt{\varepsilon^*_{Water}} + (1-S_W)\Phi\sqrt{\varepsilon_{Oil}} \quad (4)$$

The above expression is called the complex refractive index method, CRIM. Note that the DC limit of this equation is Archie's equation with m=n=2. Generalized CRIM model is:

$$(\varepsilon_{Formation})^n = (1-\Phi)\varepsilon_{Matrix}^n + S_W\Phi(\varepsilon^*_{Water})^n - (1-S_W)\Phi\varepsilon_{Oil}^n \quad (5)$$

$\varepsilon^*_{Formation}$ and $\varepsilon^*_{Water}$ are complex numbers, while $\varepsilon_{matrix}$ and $\varepsilon_{Oil}$ are the real numbers, n—real number. Unlike equation (4), the equation (5) provides more flexibility in fitting the measurements since offers additional fitting parameter n. In case of water, the complex relative permittivity $\varepsilon^*_W$ is described by Debye formula:

$$\varepsilon^*_{Water}(\omega) = \varepsilon_\infty + \frac{(1-i\omega\tau)(\varepsilon_s - \varepsilon_\infty)}{1+(\omega\tau)^2} - i\frac{\sigma}{\omega\varepsilon_0} =$$

$$\varepsilon_\infty + \frac{(\varepsilon_s - \varepsilon_\infty)}{1+(\omega\tau)^2} - i\left(\frac{\sigma}{\omega\varepsilon_0} + \frac{\omega\tau(\varepsilon_s - \varepsilon_\infty)}{1+(\omega\tau)^2}\right) = \varepsilon' - i\varepsilon'',$$

where conductivity $\sigma$ proportional to the water salinity.

$$\varepsilon^*_{Water}(\omega) = \varepsilon_\infty + \frac{\varepsilon_s - \varepsilon_\infty}{1+i\omega\tau} - i\frac{\sigma}{\omega\varepsilon_0}, \quad (6)$$

where $$\varepsilon' = \varepsilon_\infty + \frac{(\varepsilon_s - \varepsilon_\infty)}{1+(\omega\tau)^2},$$

$$\varepsilon'' = \left(\frac{\sigma}{\omega\varepsilon_0} + \frac{\omega\tau(\varepsilon_s - \varepsilon_\infty)}{1+(\omega\tau)^2}\right).$$

Unlike the CRIM, the alternative mixing laws do not exhibit explicit connection between complex dielectric value of formation and $S_W$ and $\Phi$. In general this connection is latent in nonlinear functions: $S_W = f_{S_W}(\alpha, \beta)$ and $\Phi = f_\Phi(\alpha, \beta)$, where $\alpha$ and $\beta$ are parameters of the following popular approximations:

$$\text{Cole-Cole: } \varepsilon^*_{Formation}(\omega) = \varepsilon_\infty + \frac{(\varepsilon_s - \varepsilon_\infty)}{1+(i\omega\tau_0)^{1-\alpha}} - i\frac{\sigma}{\omega\varepsilon_0} \quad (7)$$

$$\text{Cole-Davidson: } \varepsilon^*_{Formation}(\omega) = \varepsilon_\infty + \frac{(\varepsilon_s - \varepsilon_\infty)}{(1+i\omega\tau_0)^\beta} - i\frac{\sigma}{\omega\varepsilon_0} \quad (8)$$

$$\text{Havriliak-Negami: } \varepsilon^*_{Formation}(\omega) = \varepsilon_\infty + \frac{(\varepsilon_s - \varepsilon_\infty)}{\{1+(i\omega\tau_0)^{1-\alpha}\}^\beta} - i\frac{\sigma}{\omega\varepsilon_0}, \quad (9)$$

where $\sigma$ corresponds to the water conductivity at the DC limit. Both parameter $\beta$ and $\alpha$ vary between 0 and 1. When $\alpha=0$ Havriliak-Negami coincides with Cole-Davidson.

Aspects of the present disclosure take advantage of a possibility to fit dispersive resistivity and dielectric constant with polynomial functions, for example linear and quadratic functions without any concern for an appropriate mixing law. Application of the mixing law constitutes a second step of the dielectric data interpretation which may be done conventionally. By doing that we reserve the possibility for a future interpreter to apply additional information (e.g., a priori information) and apply a variety of mixing laws at the second step. Thus, the examples of petro-physical property determination below are given only to demonstrate the power of approximants as disclosed herein in fitting synthetic and experimental data.

To demonstrate the validity of the proposed dispersion model both synthetic and real measurements, characterizing oil- and water saturated sandstone as well as carbonates, are presented below. The data were generated in the frequency range between 35 and 1000 MHz.

From EM inversion we derive parameters $\sigma(\omega)$, $\varepsilon(\omega)$. To establish a link between these parameters and petro-physical properties $\sigma(\omega)$ and $\varepsilon(\omega)$ are combined into the complex dielectric value $\varepsilon^*(\omega)=\varepsilon(\omega)-i\sigma(\omega)/\omega\varepsilon_0=\varepsilon'-i\varepsilon''$ and petro-physical characteristics of the formation may be derived using one of the mixing laws.

As described above, aspects of the disclosure include estimation of properties of a subterranean volume of an earth formation from measurements taken in a borehole intersecting the volume. These measurements may be acquired using specially configured downhole tools.

FIG. 1A shows an exemplary embodiment of a system for evaluation of an earth formation using measurements from a downhole electromagnetic tool. The system 10 includes a carrier 11 that is shown disposed in a wellbore or borehole 12 that penetrates at least one earth formation 13 during a drilling operation and makes measurements of properties of the formation 13 and/or the borehole 12 downhole. As described herein, "borehole" or "wellbore" refers to a single hole that makes up all or part of a drilled well. Depending on the configuration, the system 10 may be used during drilling and/or after the wellbore 12 has been formed. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

It should be understood that embodiments of the present disclosure are equally well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc) refer to the direction of travel along the borehole either toward or away from the surface, with the upward direction being toward the surface and the downward direction being away from the surface.

In some embodiments, the system 10 includes a downhole wireline tool 100 suspended in a borehole 12 penetrating an earth formation 13 from a suitable carrier 11, such as a cable that passes over a sheave mounted on a derrick 14. The cable may include a stress member and a number of conductors (typically seven) for transmitting commands to the tool 100 from the surface, receiving data at the surface from the tool, and supplying power to the tool. The tool 100 may be raised and lowered by a draw works.

Downhole tool 100 may be coupled or combined with additional tools including some or all the hardware environment 29, described in further detail below. The hardware environment 29 may implement one or more control units configured to operate the tool 100 or other components of system 10, and/or conduct method embodiments disclosed below. The hardware environment 29 may include at least one processor, implemented, for example, as a suitable computer. The hardware environment 29 may be located downhole, at the surface, and/or remotely and provide for performing data analysis in the field (including in real time), or alternatively, the recorded data may be sent to a remote processing center for post processing of the data. Also, the data may be partially processed in real time and partially at a processing center.

A surface control system 15 may receive signals from downhole sensors and other sensors used in the system 10 and processes such signals according to programmed instructions provided to the surface control system 15. The surface control system 15 may display desired parameters and other information on a display/monitor that is utilized by an operator. The surface control system 15 may further communicate with a downhole control system 20 at a suitable location on downhole tool 10. The surface control system 15 may process data relating to the operations and data from the sensors, and may control one or more downhole operations performed by system 100.

In one embodiment, electronics associated with sensors 120 and/or 130 may be configured to record and/or process the information obtained. Certain embodiments of the present disclosure may be implemented with a hardware environment 29 that includes an information processor 17, an information storage medium 13, an input device 7, processor memory 9, and may include peripheral information storage medium 19. The hardware environment may be in the well, at the rig, or at a remote location. Moreover, the several components of the hardware environment may be distributed among those locations. The input device 7 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, circuitry associated with the sensors may be configured to take measurements at a plurality of borehole depths as the tool moves along the longitudinal axis of the borehole. These measurements may be substantially continuous, which may be defined as being repeated at very small increments of depth, such that the resulting information has sufficient scope and resolution to provide an image of borehole parameters. As described herein, "borehole" or "wellbore" refers to a single hole that makes up all or part of a drilled well. Depending on the configuration, the system may be used during drilling and/or after the wellbore has been formed. While a land system is shown, the teachings of the present disclosure may also be utilized in offshore or subsea applications.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In other embodiments, such electronics may be located elsewhere (e.g., at the surface, or remotely). To perform the measurement during a single trip, the tool may use a high bandwidth transmission to transmit the information acquired using sensor components 20 and 30 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the measurement activity in "real time." Each of the components described above may be implemented as one or more electrical components, such as integrated circuits (ICs), operatively connected via a circuit board in accordance with techniques of the present disclosure.

A point of novelty of the system illustrated in FIG. 1A is that the control unit(s), together with electromagnetic transmission and receiving components, are configured to perform certain methods (discussed below) that are not in the prior art. A surface control unit and/or downhole control unit may be configured to control sensors described above and to estimate a parameter of interest according to methods described herein. Control of these components may be carried out using one or more models or algorithms using methods described below.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Various types of electrical sensors may be used in evaluating the formation in accordance with embodiments disclosed herein. As one example, sensors that are based on electromagnetic (EM) wave propagation are used for many applications where amplitude and phase of wave traveled in an unknown medium are studied to infer the properties of that medium. Although aspects of the disclosure may be particularly useful in addressing challenges associated with (EM) wave propagation, particular embodiments may employ the techniques disclosed herein in connection with various types of induction logging, including multi-component induction logging. In some embodiments, the electromagnetic tool may include at least one transmitting antenna and at least one receiving antenna, which may be disposed on a tool body, such as a tool mandrel or other tool housing, mounted on a pad, and so on as will occur to those of skill in the art.

Figure 1B:
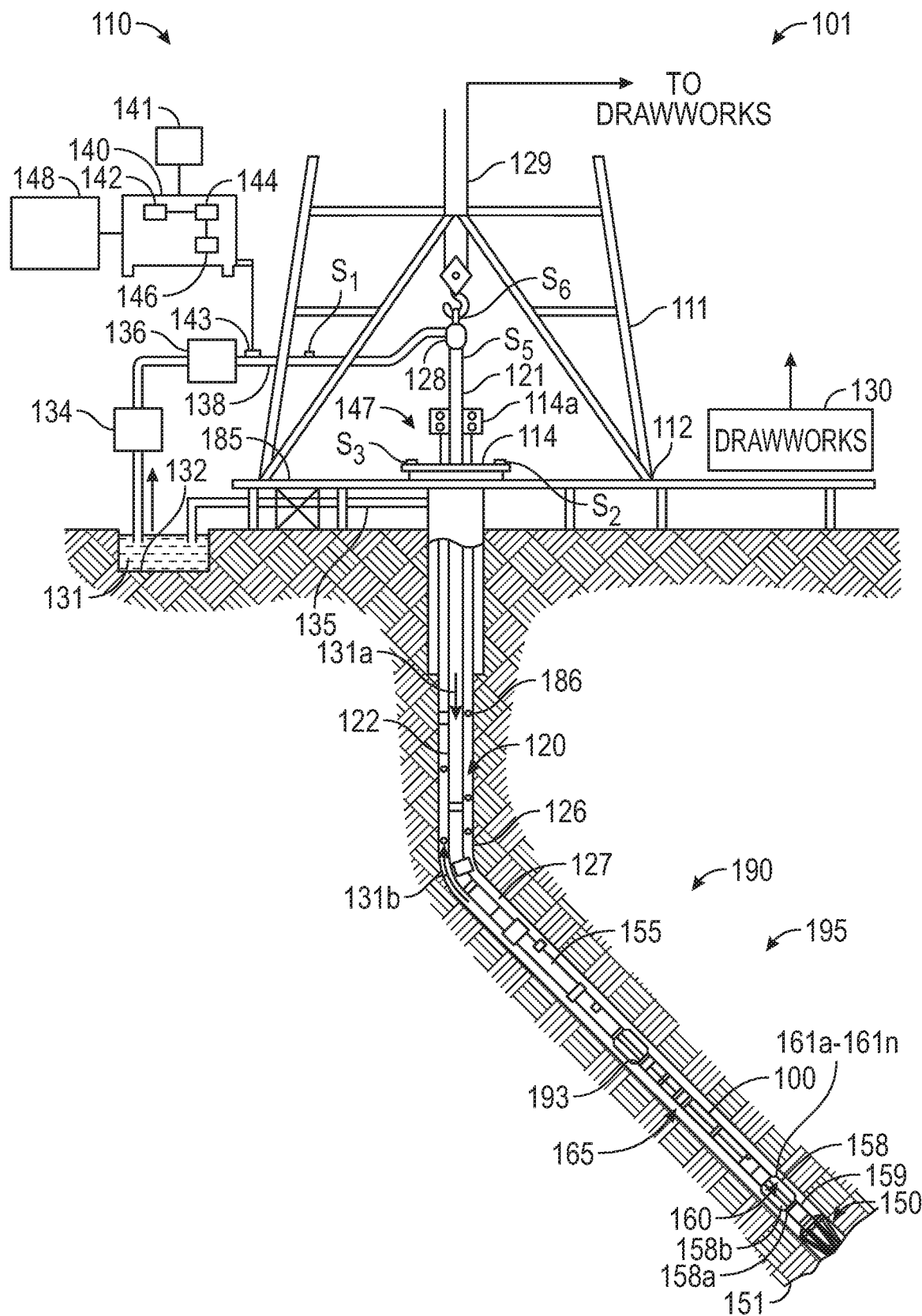
FIG. 1B shows an exemplary embodiment of an MWD system for evaluation of an earth formation using measurements from a well logging tool.

Aspects of the present disclosure are subject to application in various different embodiments. In some general embodiments, carrier 15 is implemented as a tool string of a drilling system, and measurements taken in the borehole may be characterized as "logging-while-drilling" (LWD) or "measurement-while-drilling" (MWD) operations. FIG. 1B shows an exemplary embodiment of an MWD system for evaluation of an earth formation using measurements from a well logging tool. The system 101 includes a carrier 111 that is shown disposed in a wellbore or borehole 126 that penetrates at least one earth formation 195.

FIG. 1B shows a drill string 120 including a bottomhole assembly (BHA) 190 conveyed in the borehole 126 as the carrier. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a discharger 136 and the fluid line 138. The drilling fluid 131a from the drilling tubular discharges at the borehole bottom 151 through openings in the drill bit 150. The returning drilling fluid 131*b* circulates uphole through the annular space 127 between the drill string 120 and the borehole 126 and returns to the mud pit 132 via a return line 135 and drill cutting screen 185 that removes the drill cuttings 186 from the returning drilling fluid 131*b*. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays drilling parameters and other parameters of interest related to the borehole, formation, and drilling operations, and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, and data received from downhole; and may control one or more operations of the downhole and surface devices. The data may be transmitted in analog or digital form.

The BHA 190 may include a tool 110 configured for performing well logging measurements. The BHA 190 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 150. For convenience, all such sensors are generally denoted herein by numeral 165. The BHA 190 may further include a variety of other sensors and devices 159 for determining one or more properties of the BHA 190, such as vibration, bending moment, acceleration, oscillations, whirl, stick-slip, weight-on-bit, fluid flow rate, pressure, temperature, rate of penetration, azimuth, tool face, drill bit rotation, etc.

The BHA 190 may include a steering apparatus or tool 158 for steering the drill bit 50 along a desired drilling path. In one aspect, the steering apparatus may include a steering unit 160, having a number of force application members 161*a*-161*n*. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158*a* to orient the bent sub in the wellbore and the second steering device 158*b* to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 120 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control of system 101 and processing of information, such as information from the sensors. The non-transitory computer-readable medium may include one or more ROMs, EPROMs, EAROMs, EEPROMs, flash memories, RAMs, hard drives and/or optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate the formation.

Surface processor 142 or downhole processor 193 may also be configured to control steering apparatus 158, mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling parameters, steering the drillbit (e.g., geosteering, including cessation of further advancement of the drillbit), altering the drilling fluid program, activating well control measures, and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 142, downhole processor 193, or other processors (e.g. remote processors) may be configured to operate the well logging tool 110 to make well logging measurements. Each of these logical components of the drilling system may be implemented as electrical circuitry, such as one or more integrated circuits (ICs) operatively connected via a circuit board in accordance with techniques of the present disclosure.

The system 101 may include any number of downhole tools for various processes including formation drilling, geosteering, and formation evaluation (FE) for making measurements versus depth and/or time of one or more physical properties in or around a borehole, including a volume of interest of the formation intersected by the borehole. The tool 110 may be included in or embodied as a BHA, drillstring component or other suitable carrier.

While a drill string 120 is shown as a conveyance device for tool 110, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 101 may include a bottomhole assembly and/or sensors and equipment for implementation of embodiments of the present disclosure on either a drill string or a wireline.

As described above, dielectric measurement and evaluation may include the estimation of electric permittivity of materials. Electric permittivity may include imaginary and real parts, which may vary with the frequency of an electrical signal exposed to a material. In some aspects, electric permittivity may be estimated using an electromagnetic (EM) tool configured to generate an electric current at a plurality of frequencies.

EM Tools

Figure 2A:
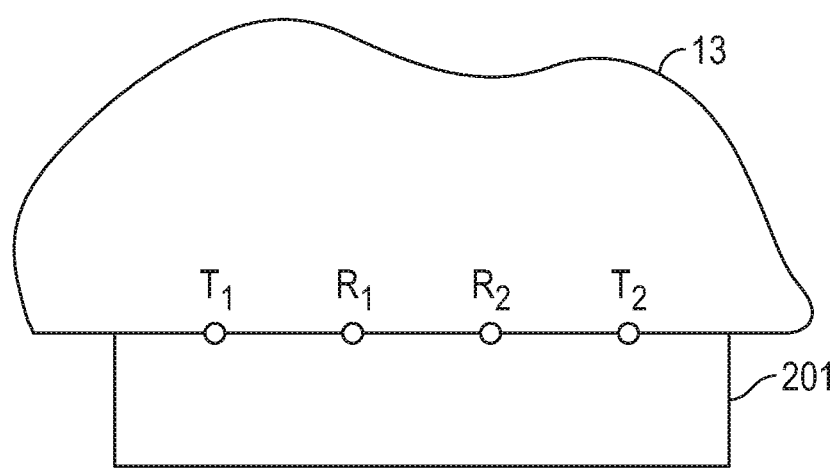
FIG. 2A depicts a cross-sectional view of downhole tool in a homogenous medium.

FIG. 2A depicts a cross-sectional view of downhole tool 201 (e.g., electromagnetic tool, dielectric tool, or other logging tool, etc.) in a homogenous medium. The tool 201 may include transmitters T1, T2 and receivers R1, R2. The transmitters T1, T2 may be symmetrically arranged with the receivers R1, R2. That is, the distance from T1 to R1 may be equal to the distance from T2 to R2; and the distance from T1 to R2 may be equal to the distance from T2 to R1. Methods for obtaining EM propagation measurements (e.g., relative phase and attenuation) using these tools are well known in the art. See for example, U.S. patent application Ser. No. 13/991,029 to Dorovsky et al. and U.S. patent application Ser. No. 15/280,815 to Kouchmeshky et al., each incorporated herein by reference.

A conventional technique of measurement compensation involving two receivers positioned symmetrically with respect to two transmitters (as shown in FIG. 2A) is demonstrated. The relative phase shift between R1 and R2 when T1 is fired may be given by:

$$\theta_{R_1R_2}^{T1}=\theta_{R_2}^{T1}-\theta_{R_1}^{T1} \quad (15)$$

The relative phase shift between R1 and R2 when T2 is fired may be given by:

$$\theta_{R_1R_2}^{T2}=\theta_{R_1}^{T2}-\theta_{R_2}^{T2} \quad (16)$$

The compensated relative phase may be given by:

$$\theta_{R_1R_2}=0.5(\theta_{R_1R_2}^{T1}+\theta_{R_1R_2}^{T2}) \quad (17)$$

where $\theta_{R_j}^{T_i}$ is the phase measured by receiver j when transmitter i is fired and can be written as $$\theta_{R_j}^{T_i}=\theta_{T_i}+\theta_{R_j}+\theta(r) \quad (18)$$

in which $\theta_{T_i}$ and $\theta_{R_j}$ are the phase shifts of transmitter i and receiver j with respect to a common source and θ(r) is the phase shift due to wave traveling in the probed medium between transmitter and receiver which are apart by a distance of r.

Equations (15) and (16) eliminate the effect of internal phase shift at T1 and T2. As it can be seen from plugging in Equation (18) in Equations (15) and (16) and using Equation (17) one can eliminate the effect of phase shift at R1 and R2. The assumption behind this method is that the wave traveling from either of the transmitters would experience the same phase shift in the probed medium which means that the medium in front of the transmitter and receiver should be homogenous or symmetrically positioned (with respect to transmitters and receivers) heterogeneous.

Figure 2B:
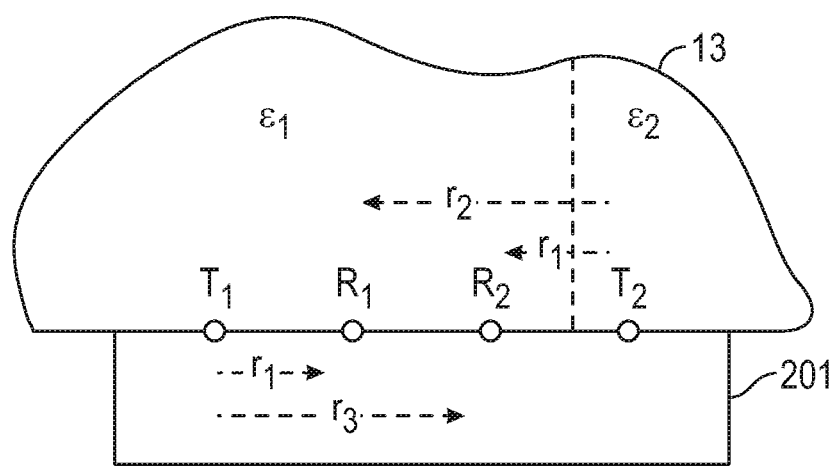
FIG. 2B depicts a cross-sectional view of a tool in heterogenous media having relative permittivities, $\varepsilon 1$ and $\varepsilon 2$.

FIG. 2B depicts a cross-sectional view of tool 201 in heterogenous media having relative permittivities, $\varepsilon_1$ and $\varepsilon_2$. Generally, for an electromagnetic wave propagating in a near field regime, the phase difference between the wave passing through points in space is not only a function of the distance between the two points ($r_2-r_1$) but also a function of absolute position of those points ($r_1$ and $r_2$). Consider the medium of FIG. 2B, where the tool is positioned in a way that the interface between medium 1 and medium 2 is located between Transmitter 2 and the closest receiver (Receiver 2). Ignoring the effect of reflection at the interface, the effect of medium 2 can be replaced by an equivalent medium with the same properties as of medium 1, but with longer distance between Transmitter 2 and receivers (since $\varepsilon_2>\varepsilon_1$).

Figure 2C:
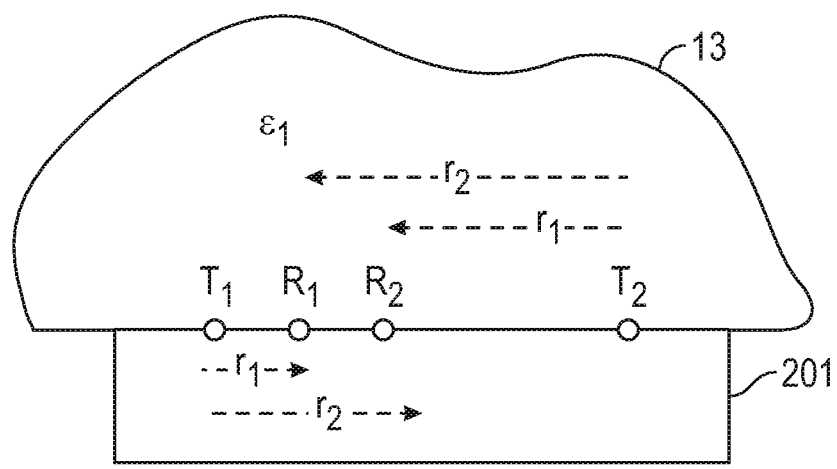
FIG. 2C shows the approximate effect of heterogeneous media on the propagation of an electromagnetic wave.

FIG. 2C shows the approximate effect of heterogeneous media on the propagation of an electromagnetic wave. Referring to FIGS. 2B-2C, although $r_2-r_1=r^*_2-r^*_1$, $r_2 \neq r^*_2$ and $r_1 \neq r^*_1$; thus, the "simulated" distances between transmitter and receivers from the left and right are not equal. This leads to an unequal phase shift for an electromagnetic wave travelling from these transmitters, which renders the traditional approach invalid.

Figure 2D:
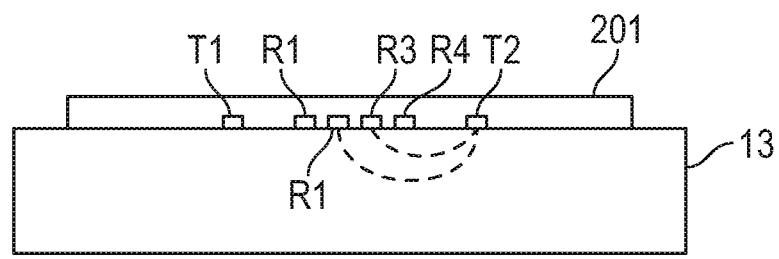
FIG. 2D shows the phase shifts of wave propagation tool according to embodiments of the present disclosure.

FIG. 2D shows the phase shifts of wave propagation tool 207 according to embodiments of the present disclosure. Tool 207 may include transmitters T1, T2 and receivers R1-R4. The transmitters T1, T2 may be symmetrically arranged with the receivers R1-R4. For example, the distance from T1 to R1 may be equal to the distance from T2 to R4; and the distance from T1 to R2 may be equal to the distance from T2 to R3.

Referring to FIG. 2D, to obtain the phase difference between receivers R2 and R3, the symmetrical transmitters are used to cancel the effect of phase shift on each receiver. Upon firing transmitter T1, the phase shifts at R2 and R3 may be expressed as:

$$\theta_{R_3}^{T1}=\theta_{T_1R_3}-\theta_{R_3}^{sh} \quad (19)$$

$$\theta_{R_2}^{T1}=\theta_{T_1R_2}-\theta_{R_2}^{sh} \quad (20)$$

where $\theta_{R_j}^{T_i}$ is the phase shift recorded at receiver j when transmitter i is fired, $\theta_{T_iR_j}$ is representative of the time the EM wave propagates in the formation, $\theta_{R_j}^{sh}$ is the internal value of the phase shift at receiver j. The relative phase shift between receivers R2 and R3 after firing transmitter T1 (i.e., $\theta_{R_2}^{T_1} - \theta_{R_3}^{T_1}$) may be expressed as:

$$\theta_{R_2R_3}^{T_1} = \theta_{T_1R_2} + \theta_{R_2}^{sh} - \theta_{T_1R_3} - \theta_{R_3}^{sh} \quad (21)$$

Upon firing transmitter T2, the phase shifts at R2 and R3 may be expressed as:

$$\theta_{R_3}^{T_2} = \theta_{T_2R_3} - \theta_{R_3}^{sh} \quad (22)$$

$$\theta_{R_2}^{T_2} = \theta_{T_2R_2} - \theta_{R_2}^{sh} \quad (23)$$

The relative phase shift between receivers R3 and R2 after firing transmitter T2 may be expressed as ($\theta_{R_3}^{T_2} - \theta_{R_2}^{T_2}$):

$$\theta_{R_3R_2}^{T_2} = \theta_{T_2R_3} + \theta_{R_3}^{sh} - \theta_{T_2R_2} - \theta_{R_2}^{sh} \quad (24)$$

Conventionally, it may be assumed that these phase shifts are equal:

$$\theta_{T_2R_2} = \theta_{T_1R_3}, \theta_{T_2R_3} = \theta_{T_1R_2} \quad (25)$$

After substituting $\theta_{T_1R_2}$ and $\theta_{T_1R_3}$ into Eq. (24), the relative phase shift between receivers R3 and R2 after firing transmitter T2 (i.e., $\theta_{R_3}^{T_2} - \theta_{R_2}^{T_2}$) may be given by:

$$\theta_{R_3R_2}^{T_2} = \theta_{T_1R_2} + \theta_{R_3}^{sh} - \theta_{T_1R_3} - \theta_{R_2}^{sh} \quad (26)$$

Thus, a compensated measurement for the relative phase between receivers R3 and R2 may be given as:

$$\theta_{R_2R_3}^{com} = \frac{\left(\theta_{R_2R_3}^{T_1} + \theta_{R_3R_2}^{T_2}\right)}{2} \quad (27)$$

$$\theta_{R_2R_3}^{com} = \theta_{T_1R_2} - \theta_{T_1R_3} \quad (28)$$

Techniques in accordance with embodiment of the present disclosure as described herein may be employed in connection with a variety of downhole tools conveyed on various carriers. Several general examples are described hereinbelow.

Figure 3A:
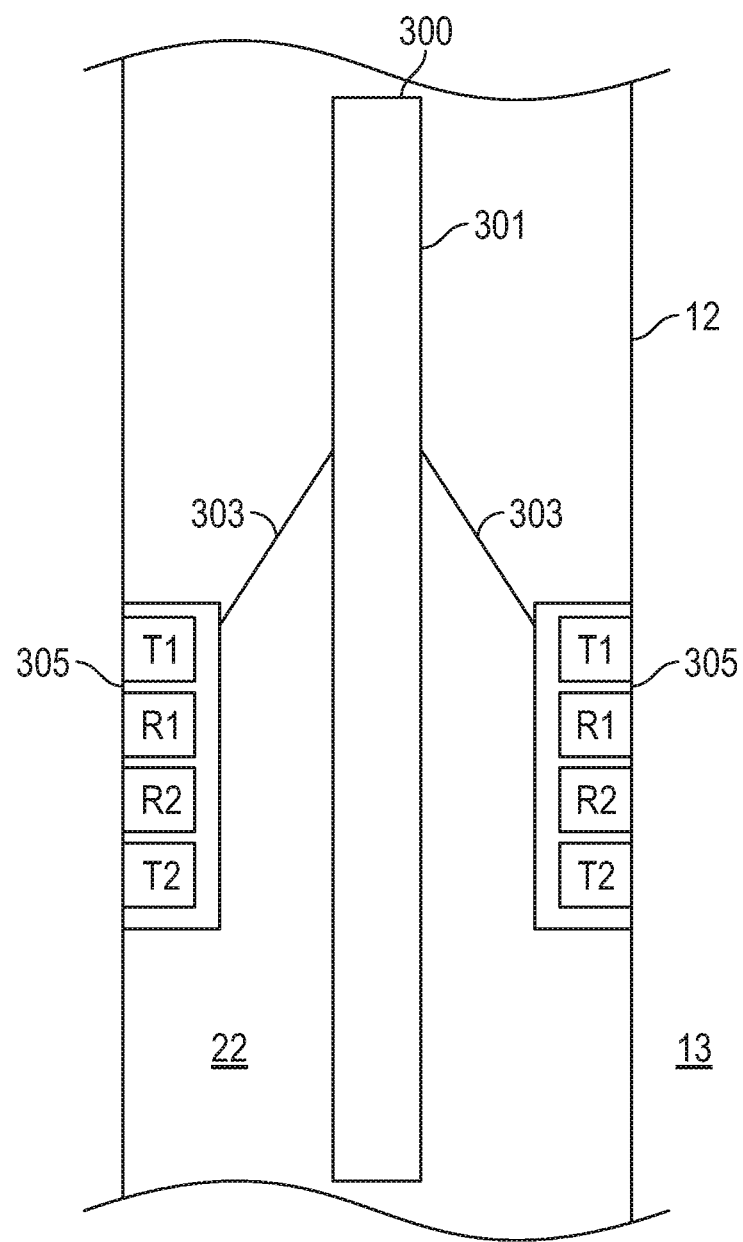
FIG. 3A shows a downhole logging tool for evaluating an earth formation in accordance with embodiments of the present disclosure.

FIG. 3A shows downhole logging tool (downhole tool, logging tool, multi-frequency dielectric array logging tool, electromagnetic tool, dielectric tool, or tool) 300 for evaluating an earth formation according to embodiments of the present disclosure. The dielectric tool 300 may be disposed on carrier 11 (not shown) intersecting the earth formation 13. The dielectric tool 300 may include a body (e.g., BHA, housing, enclosure, drill string, wireline tool body) 301 having pads 305 extended on extension devices 303. Two pads are shown for illustrative purposes and, in actual practice, there may be more or fewer pads, such as three pads separated by about 120 degrees circumferentially or six pads separated by about 60 degrees. The extension devices 305 may be electrically operated, electromechanically operated, mechanically operated or hydraulically operated. With the extension devices 303 fully extended, the pads (dielectric tool pads) 305 may engage the borehole 12 and make measurements indicative of at least one parameter of interest of the volume under investigation, such as water saturation, water conductivity, water permittivity, permittivity of dry rock, permittivity of hydrocarbons, textural parameters of the formation (e.g., grain shape), cation exchange capacity ('CEC'), and total porosity.

Pads 305 may include a face configured to engage the borehole 12. The term "engage," as used herein, may be defined as in contact with the borehole 12, urged against the borehole 12, pressed firmly against the borehole 12, or positioned proximate the borehole 12. The term "proximate," as used herein, may be defined as the pad being near the borehole 12 such that measurements may be taken from the pad that are useful in evaluating the borehole, earth formation, or both. The term "face" refers to the surface, edge, or side of the tool body or pad that is closest to the borehole wall.

Pads 305 may include transmitter T1, T2 and receivers R1, R2. The transmitters may be configured to radiate EM waves into the formation; and the receivers may be configured to be responsive to the EM waves radiating in the formation and generate a signal that is indicative of the parameter of interest. A processor may be configured to estimate the amplitude attenuation and phase difference between the transmitted signal and the received signals, which are used to estimate the parameter of interest. As an example, the attenuation and phase difference may be estimated between the received signals from at least two spaced receivers. This processing may be done downhole or at the surface, by using one or more processors hardware environment 29.

Figure 3B:
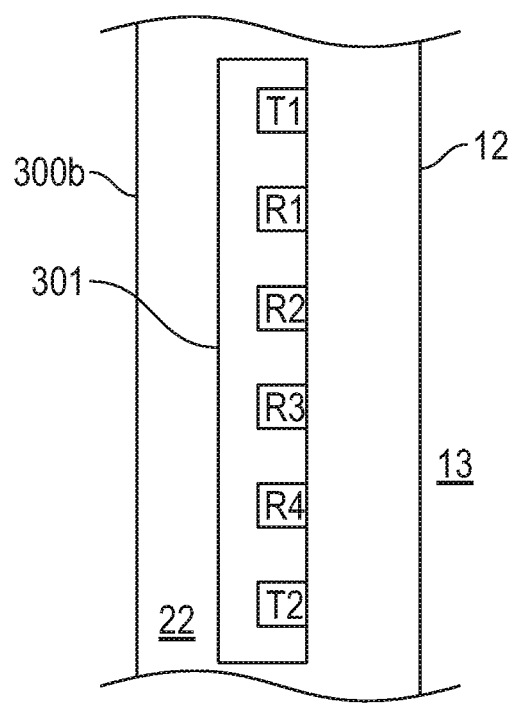
FIG. 3B shows a cross-sectional view of a multi-frequency dielectric logging tool in accordance with embodiments of the present disclosure.

FIG. 3B shows a cross-sectional view of multi-frequency dielectric logging tool 300b in accordance with embodiments of the present disclosure. Dielectric tool 300b may include tool body 301 having transmitters T1, T2 and receivers R1-R4 disposed on tool body 301. In other embodiments, the transmitter-receiver configuration of logging tool 300b may be included on pads 305.

Figure 3C:
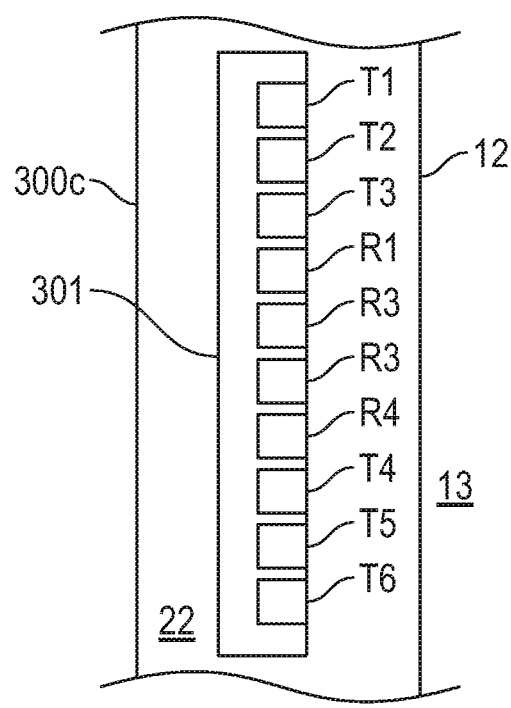
FIG. 3C shows a cross-sectional view of multi-frequency dielectric logging tool in accordance with embodiments of the present disclosure.

FIG. 3C shows a cross-sectional view of multi-frequency dielectric logging tool in accordance with embodiments of the present disclosure. Dielectric tool 300c may include tool body 301 having transmitters T1-T6 and receivers R1-R4 disposed on tool body 301. In other embodiments, the transmitter-receiver configuration of logging tool 300c may be included on pads 305.

Referring to FIGS. 3A-3C, the transmitters may be positioned symmetrically on pads 305 or tool body 301 with respect to the receivers on dielectric tools 300, 300b, and 300c. For example, on dielectric tool 300b, the distance from T1 to R3 may be the same distance as from T2 to R2; and the distance from T1 to R1 may be the same distance as from T2 to R4. In addition, each receiver may have a spacing from its adjacent receiver such that an EM wave propagating between those receivers travels at most one half wavelength (i.e., the propagation of EM waves between each adjacent receiver has a phase shift that is no greater than π radians or 180° due to the formation and not taking into account internal phase shifts of the tool circuitry). Also, the spacing between R1 and R2 may not exceed one half wavelength of the EM wave propagating in formation 13. The spacing between adjacent receivers may depend on the frequency range of the dielectric tool.

As non-limiting examples, each transmitter or receiver of the multi-frequency dielectric array logging tool may be configured as a loop antenna, a coil antenna, a monopole antenna, a dipole antenna, an antenna array, a patch antenna, a reflector antenna, a log-periodic antenna, etc. Each transmitter or receiver may be configured to operate at a plurality of frequencies.

Polynomial Techniques

Resistivity may be estimated from attenuation and phase difference using a transform, by curve fitting techniques, or using a lookup table. Additional details may be found in U.S. Pat. No. 5,081,419 to Meador et al. and U.S. Pat. No. 4,899,112 to Clark et al., each of which is herein incorporated by reference in its entirety. These measured values can be used to determine and store resistivity from attenuation [$R_{AT}$] and/or resistivity from phase shift [$R_\varphi$]. Various corrections may be made to the resistivity values in accordance with techniques of the art. The two values may be associated with various depths of investigation and/or combined as would occur to those of skill in the art.

Those versed in the art would recognize that measurements of amplitude and phase can, in addition to resistivity determination, also be used for determining the dielectric constant of the earth formation. Dielectric logging uses the contrast between dielectric constant of water, rock and oil to estimate the formation water content. The permittivity of the formation can be considered as a complex quantity which contains dielectric constant and conductivity in its real and imaginary component $$\tilde{\varepsilon}_r(\omega) = \varepsilon_r(\omega) + i\frac{\sigma(\omega)}{\omega\varepsilon_0} \quad (10)$$

where $\tilde{\varepsilon}_r$ is the complex value representing relative permittivity, $\varepsilon_r$ is relative dielectric constant, $\sigma$ is electrical conductivity, $\omega$ is angular frequency and $\varepsilon_0$ is dielectric constant of vacuum. In current dielectric logging tools, the magnitude and phase of an electromagnetic wave propagating in the formation is measured at multiple receivers. The relative magnitude and phase of a detected signal at the respective receivers is used to obtain $\varepsilon_r$ and $\sigma$, which are functions of frequency due to the dispersive behavior of the formation. In practice, the measurement is performed at multiple frequencies in order to obtain a good estimate of the dispersive behavior.

Measuring the dielectric dispersive behavior of the formation and fitting it to mixing laws that are shown to be representative of the behavior of the formation under study provides information on the volume fraction of each component and formation texture information. This may include estimating the permittivity of the various materials within the volume under investigation. Electric permittivity may include imaginary and real parts, which may vary with the frequency of an electrical signal exposed to a material.

Signal data may be generated by the multi-frequency array dielectric signals at a tool. At least one transmitter generates a plurality of electromagnetic (EM) waves propagating through the formation, resulting in measurement signals generated at least one receiver responsive to the plurality of propagating EM waves. A plurality of propagation measurements may be taken from the measurement signals representative of the propagating EM waves.

Measuring EM Properties of a Volume of an Earth Formation

FIGS. 4A-7B illustrate approximations of synthetic data in accordance with embodiments of the present disclosure. The typical value $\varepsilon_{Oil}=2.0$ was assigned in a CRIM formula to generate the dispersive curves. Matrix permittivity $\varepsilon_{Matrix}$ for the first synthetic model was 4.5 and for the second model $\varepsilon_{Matrix}=8$ (typical for carbonates). Porosity of the first and second model was equal to 21 percent and 21.8 percent, respectively. Complex water permittivity $\varepsilon^*_{Water}$ was computed via Debye formula (6) which provides the dependence on frequency. The values for $\sigma$, $\varepsilon_S$, $\tau$ in the Debye relation were derived via the Klein and Swift formulas assuming temperature of 25 C and salinity of 15 ppt. See Klein, Swift "An Improved Model for the Dielectric Constant of Sea Water at Microwave Frequencies." IEEE Transactions of Antennas and Propagation, 1978.

Figure 4A:
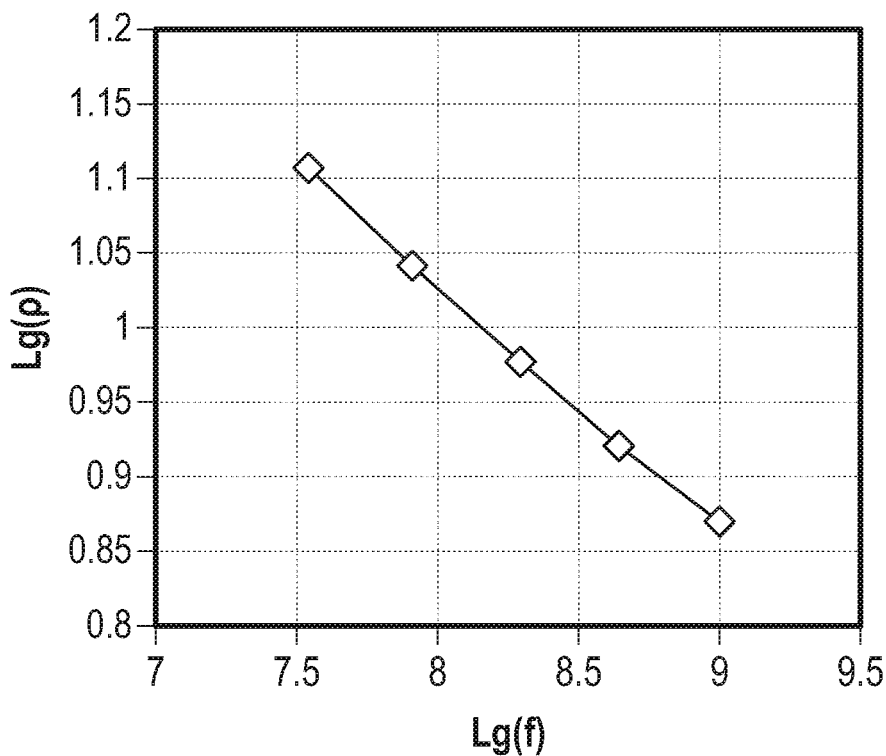
FIGS. 4A & 4B illustrate approximations of synthetic data in accordance with embodiments of the present disclosure.
Figure 4B:
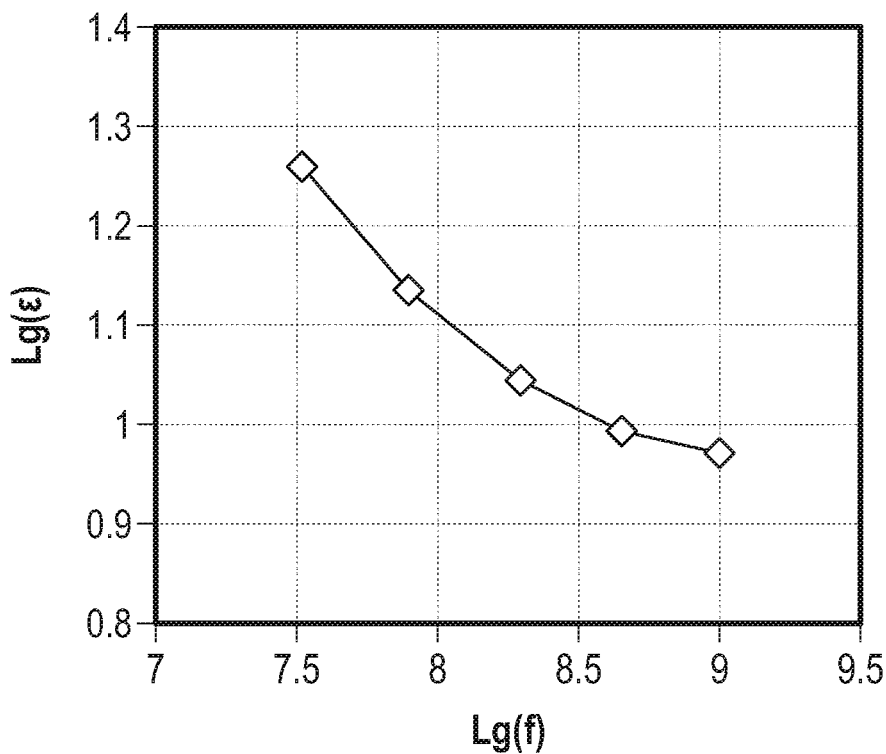

Simulated dispersive resistivity and permittivity for the first synthetic formation model, with water saturation ($S_W$) at 70 percent, are presented in FIGS. 4A & 4B in bi-logarithmic scale (square dots); frequency f is determined as $f=\omega/2\pi$. Under regression analysis, the approximation of the resistivity by the linear function yields an r-squared parameter 0.99 and approximation of the permittivity by the quadratic function yields an r-squared parameter equal to 1.0 (e.g., solid line).

Figure 5A:
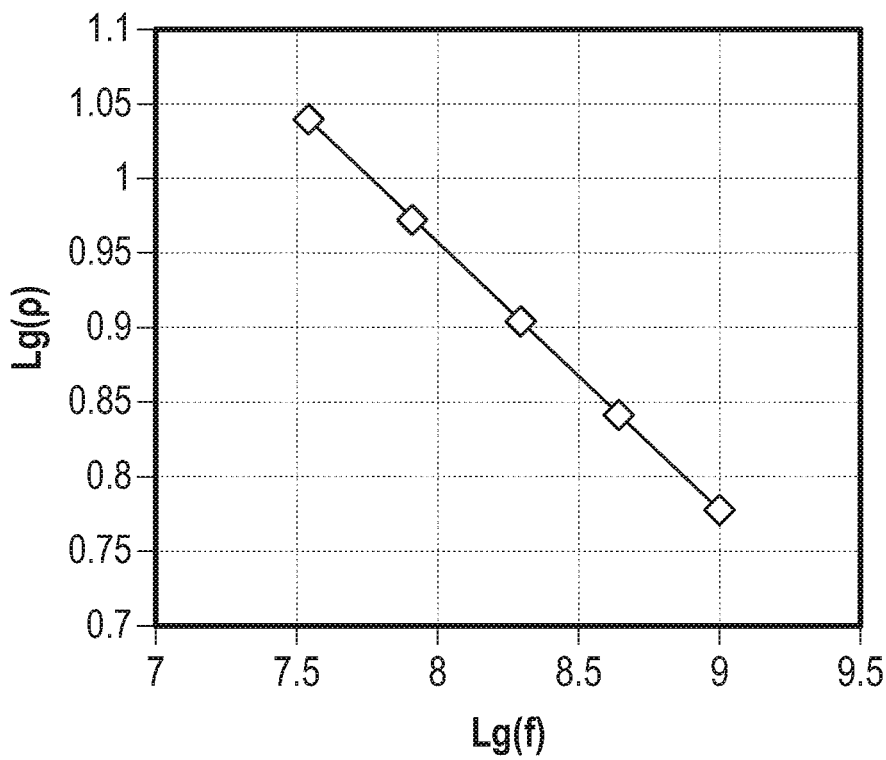
FIGS. 5A & 5B illustrate approximations of synthetic data in accordance with embodiments of the present disclosure.
Figure 5B:
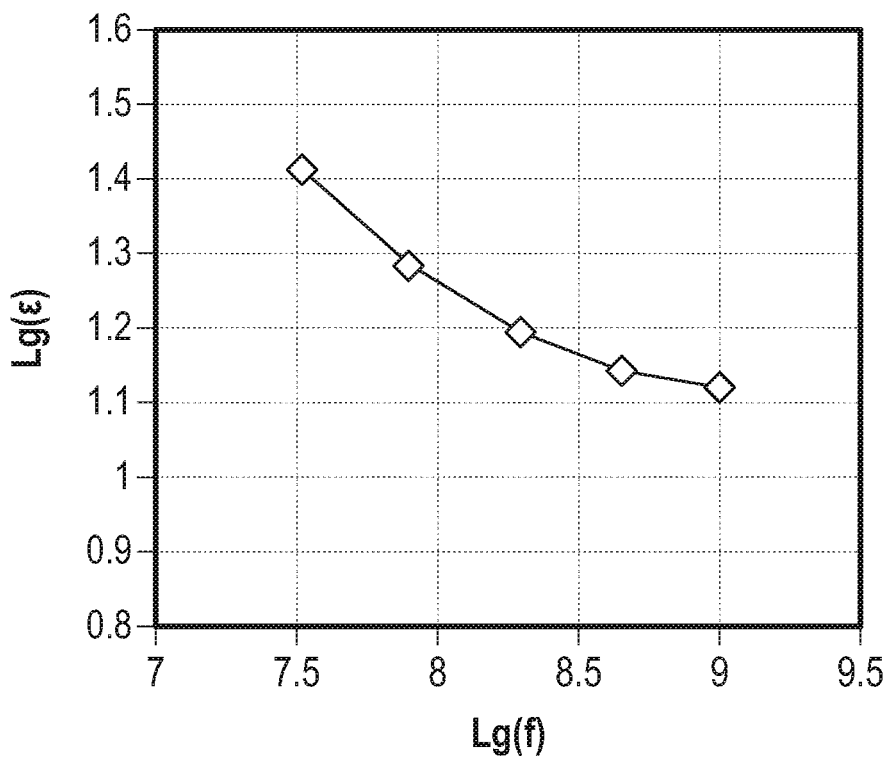

Similarly, FIGS. 5A & 5B illustrate the resistivity and permittivity are plotted for the second synthetic model with $S_W=70$ percent. The logarithmic resistivity is approximated with linear dependency with r-square equals to 0.99 and permittivity is approximated by quadratic polynomial with r-square equals to 1.0. In both cases polynomial approximation provided an optimal fit of synthetic models.

Figure 6A:
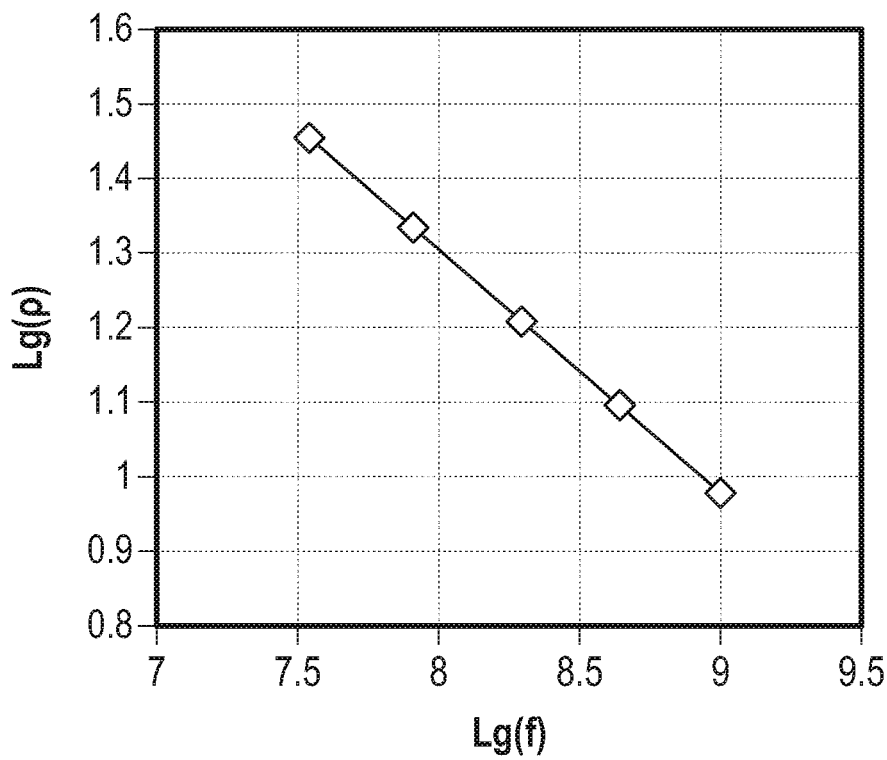
FIGS. 6A & 6B illustrate approximations of synthetic data in accordance with embodiments of the present disclosure.
Figure 6B:
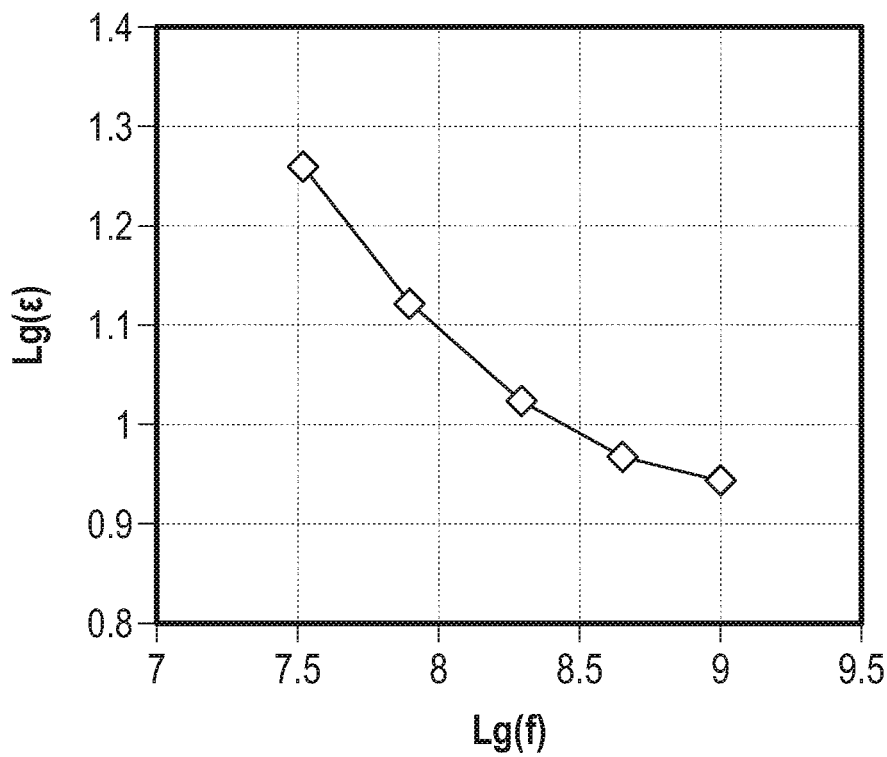
Figure 7A:
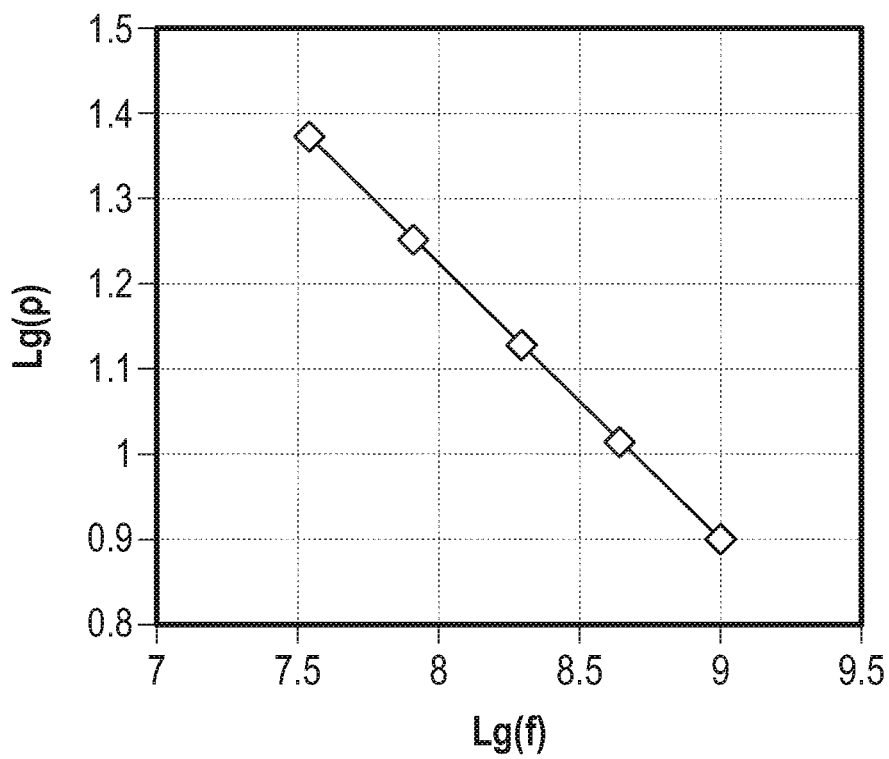
FIGS. 7A & 7B illustrate approximations of synthetic data in accordance with embodiments of the present disclosure.
Figure 7B:
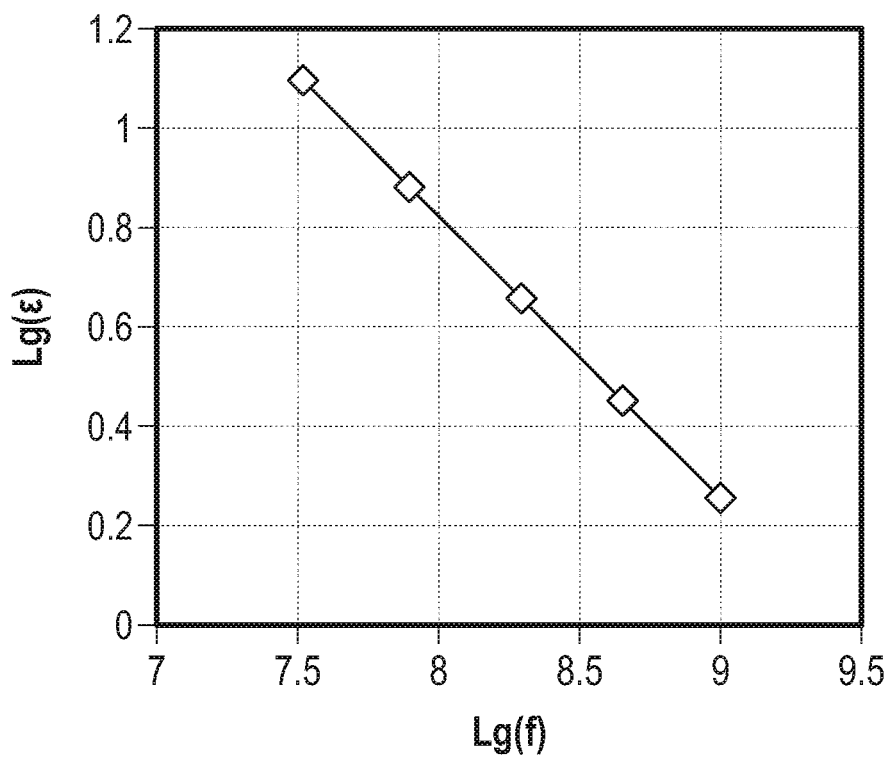

FIGS. 6A-7B illustrate approximation of synthetic data by Havriliak-Negami mixing law using polynomial fit. In FIGS. 6A & 6B sandstone with 21 percent porosity was used, while water saturation was 70 percent. In FIGS. 7A & 7B carbonate with 21.8 percent porosity was used, with 70 percent water saturation. Synthetic data described by the Havriliak-Negami mixing law represents the generalization of the Debye, Cole-Cole, Cole-Davidson dispersive relations.

We checked the validity of the polynomial approximation in application to the synthetic data corresponding to the case of saturated sandstone and carbonate. The parameters $\varepsilon_S$, $\varepsilon_\infty$, $\tau_0$, $\alpha$, $\beta$ were assigned values typical for saturated sandstone and carbonate.

| | sandstone | carbonate |
|---|---|---|
| $\varepsilon_S$ | 381.6 | 606.98 |
| $\varepsilon_\infty$ | 7.7 | 0.48 |
| $\tau_0$ | 0.31 µs | 0.52 µs |
| $\alpha$ | 0.147 | 0.1526 |
| $\beta$ | 0.799 | 0.792 |

In FIGS. 6A & 6B sandstone with 21 percent porosity was used, while water saturation was 70 percent. In FIGS. 7A & 7B carbonate with 21.8 percent porosity was used, with 70 percent water saturation. FIGS. 6A-7B illustrate a satisfactory fit of synthetic data with linear (FIGS. 6A & 7A) and quadratic (FIGS. 6B & 7B) functions.

The r-squared parameter for sandstone resistivity approximation by the linear function is 1.0 and for permittivity approximation by the quadratic function is 0.99. The r-squared value for carbonate was 1.0 for both resistivity and permittivity. It is apparent that, for the sandstone and carbonate models, excellent fit of the synthetic data is obtained with the linear and quadratic functions.

Aspects of the present disclosure include taking a plurality of experimental measurements at at least one receiver responsive to the plurality of propagating EM waves and approximating them using polynomial functions. The plurality of measurements may include resistivity measurements and dielectric constant measurements of a volume of interest of the formation.

In our example the measurements were conducted using sandstone and carbonate core saturated with distilled water and oil.

Figure 8A:
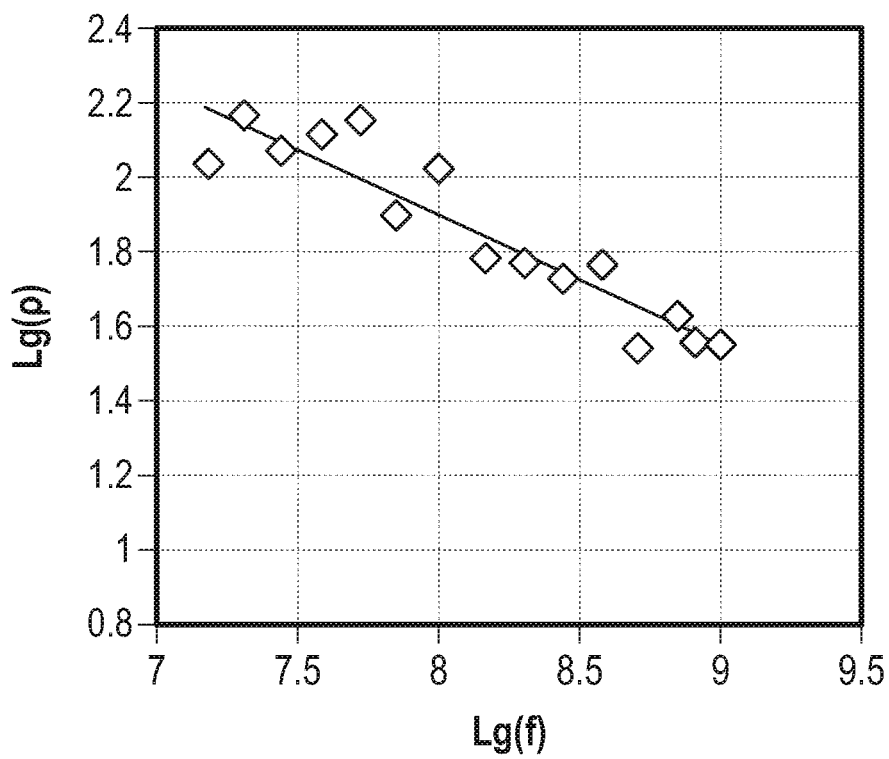
FIGS. 8A & 8B illustrate measurements and graphical depictions of the linear and quadratic functions used to fit the measurements for a sample of sandstone with 22.9% porosity and water saturation of 70 percent.
Figure 8B:
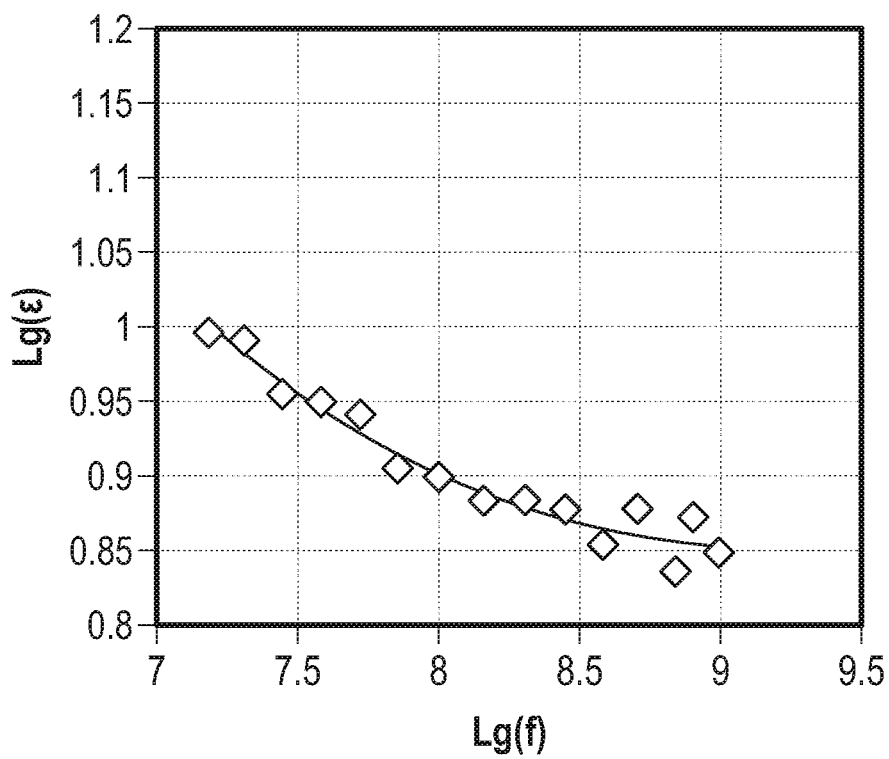

FIGS. 8A & 8B illustrate measurements and graphical depictions of the linear and quadratic functions used to fit the measurements for a sample of sandstone with 22.9% porosity and water saturation of 70 percent. The measurement frequency range was between 15.2 MHz and 1000 MHz. Polynomial approximation was applied to fit the dispersive resistivity ($\rho$) and dielectric constant ($\varepsilon$). The r-squared parameter is 0.87 and 0.95 for resistivity and permittivity correspondingly indicating on acceptable fit.

Figure 9A:
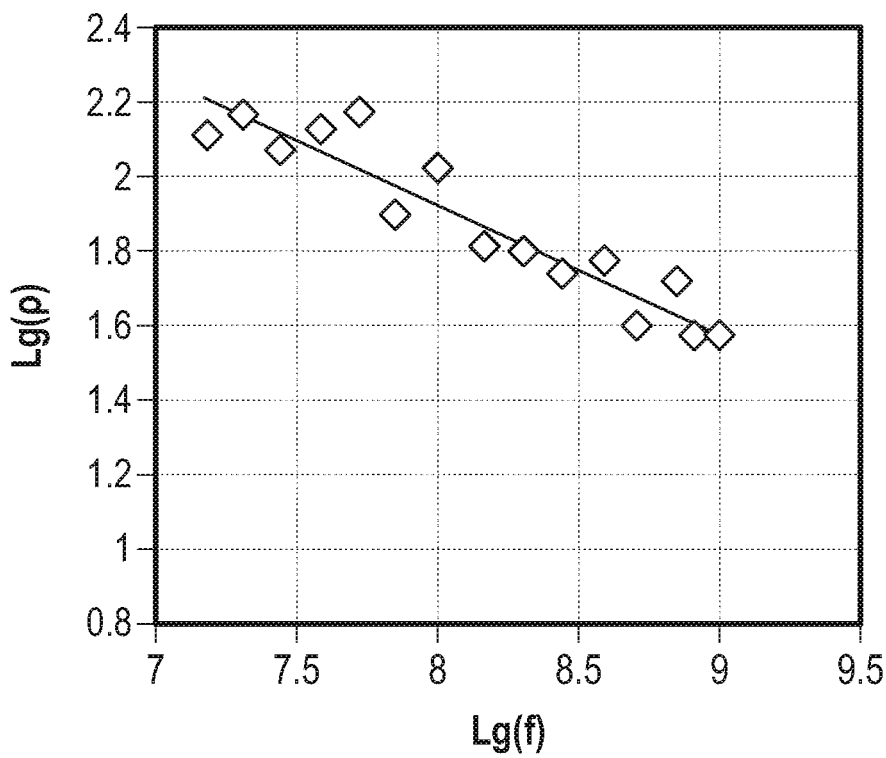
FIGS. 9A & 9B illustrate measurements and graphical depictions of the linear and quadratic functions used to fit the measurements for a carbonate sample with 21.8% porosity and 70% of water saturation.
Figure 9B:
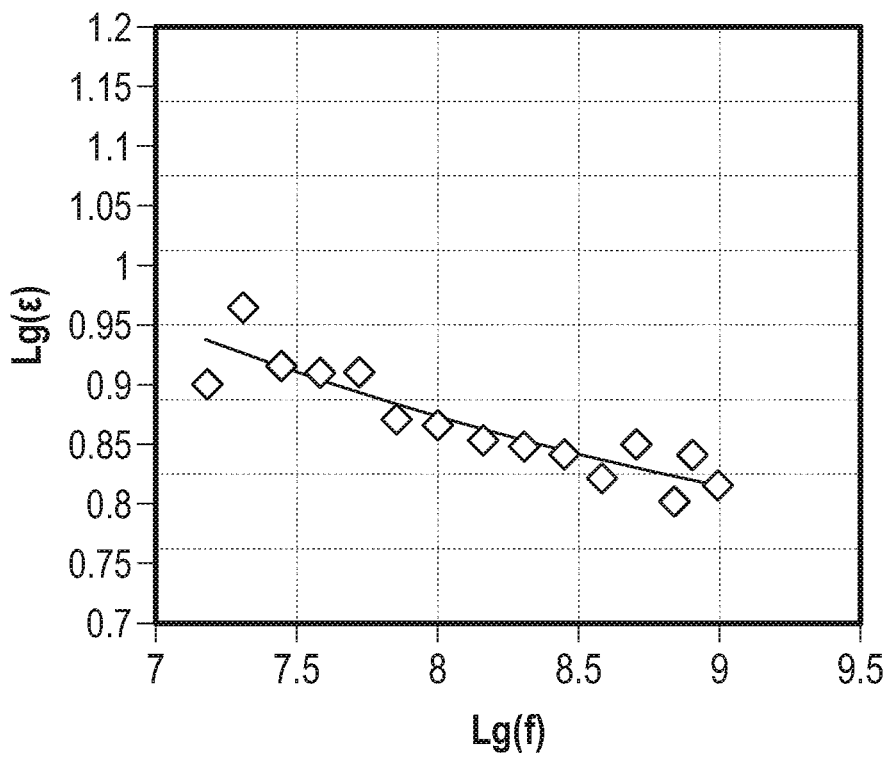

FIGS. 9A & 9B illustrate measurements and graphical depictions of the linear and quadratic functions used to fit the measurements for a carbonate sample with 21.8% porosity and 70% of water saturation. The r-square value for the linear function fit is equal to 0.89 and for the quadratic function is equal to 0.82.

Figure 10:
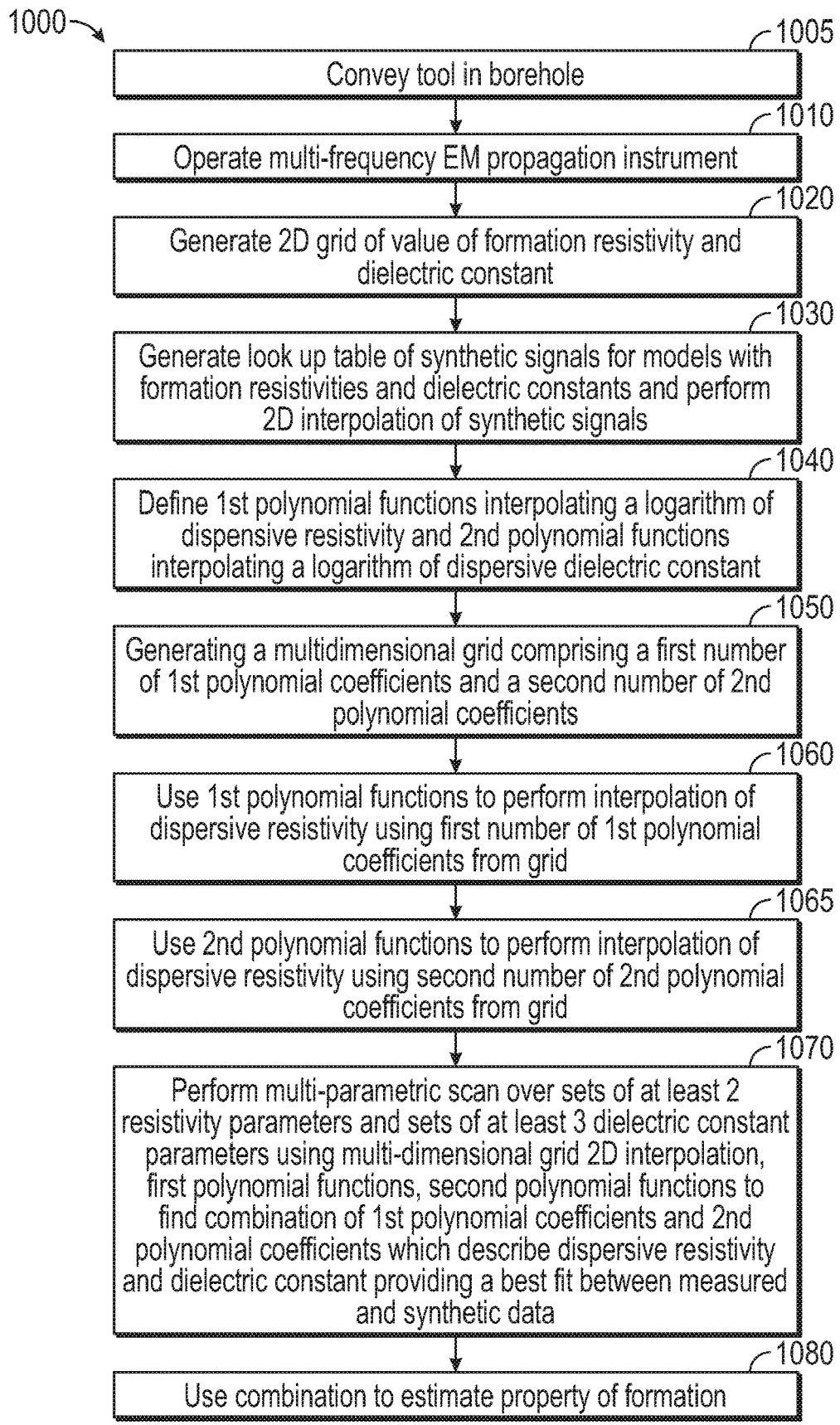
FIG. 10 illustrates methods of determining geo-electrical parameters of an earth formation intersected by a borehole in accordance with embodiments of the present disclosure.

FIG. 10 illustrates methods of determining geo-electrical parameters of an earth formation intersected by a borehole in accordance with embodiments of the present disclosure. Step 1005 may comprise conveying the tool in the borehole. The formation may possess dispersive resistivity and dispersive dielectric constant. Step 1010 of method 1000 may comprise operating a multi-frequency electromagnetic propagation instrument at at least three frequencies. Step 1010 may be carried out by energizing at least one transmitter of the instrument to induce currents in the formation, and receiving electromagnetic signals induced by the formation. Step 1020 may comprise generating a 2-dimensional grid of a plurality of values of formation resistivity in a first selected range and a plurality of values of dielectric constant in a second selected range, with the first dimension of the grid being a resistivity of the formation and the second dimension of the grid being a dielectric constant of the formation. The first selected range and the second selected range may be selected according to conventional constraints using a priori information.

Step 1030 may comprise using at least one computing unit to generate a lookup table of synthetic signals of the propagation instrument for a set of models whose formation resistivities and dielectric constants are defined in nodes of said 2-dimensional grid, and perform a 2-dimensional interpolation of the synthetic signals from the lookup table, where the first dimension is resistivity and the second dimension is dielectric constant. A set of operating frequencies is also used to generate the lookup table of synthetic signals. The models may be non-petrophysical models.

For example, an inversion module may use forward models from a forward model database to simulate predicted tool responses. The selected model may be, for example, a whole space or half-space model, or more detailed variations, such as whole space with borehole, whole space with layers, or combinations of these, and may rely on dipole or non-dipole physics. Selection of an appropriate forward model may be based on prior knowledge of formation strata (e.g., using resistivity or acoustic imaging tools), dielectric properties of mud, rugosity of the borehole (caliper readings), existence of standoff between pad and borehole wall (e.g., measured using coax sensors on the pad measuring reflection), location of the transmitter and receivers, and other a priori knowledge (e.g., proximity of the outer transmitter and receiver to the edge of the pad causes the response to be far from an ideal dipole due to discontinuity in the perfectly electric conductive medium).

Step 1040 comprises defining first polynomial functions interpolating a logarithm of the dispersive resistivity of the formation and second polynomial functions interpolating a logarithm of the dispersive dielectric constant of the formation. Defining first polynomial functions interpolating a logarithm of the dispersive resistivity of the formation may include interpolating logarithms of the dispersive resistivity as a function of a logarithm of the operating frequency with a negative slope. Defining second polynomial functions interpolating a logarithm of the dispersive dielectric constant of the formation may include interpolating a logarithm of the dispersive dielectric constant as a function of a logarithm of the operating frequency with the vertex of the quadratic functions being the lowest point on a U-shape graph and the vertex of the quadratic functions being greater than maximal operating frequency.

Step 1050 includes generating a multi-dimensional grid comprising a first number of first polynomial coefficients of said first polynomial functions and a second number of second polynomial coefficients of said second polynomial functions. Step 1060 comprises using said first polynomial functions to perform interpolation of the dispersive resistivity using the first number of first polynomial coefficients describing resistivity values from the said multi-dimensional grid. Step 1065 comprises using said second polynomial functions to perform interpolation of the dispersive dielectric constant using the second number of second polynomial coefficients from said multi-dimensional grid.

Step 1070 comprises performing a multi-parametric scan over the sets of at least 2 resistivity parameters and sets of at least 3 dielectric constant parameters using the multi-dimensional grid, 2-dimensional interpolation, first polynomial functions, and second polynomial functions to find a combination of first polynomial coefficients and second polynomial coefficients which describe dispersive resistivity and dielectric constant providing a best fit between measured and synthetic data. Step 1080 may comprise using the combination to estimate a property of the formation. The property may comprise at least one of: i) a frequency dependent conductivity parameter; and ii) a frequency dependent permittivity parameter.

In some implementations, the first polynomial functions are linear functions, the second polynomial functions are quadratic functions, the first number is 2, the second number is 3, and the multi-dimensional grid is a 5-dimensional grid. Performing a multi-parametric scan over the sets of 2 resistivity parameters and sets of 3 dielectric constant parameters may be carried out by performing 2-dimensional interpolation using values of each set in the linear functions and quadratic functions to find a combination of five polynomial coefficients which describe dispersive resistivity and dielectric constant providing a best fit between measured and synthetic data Various steps may be carried out simultaneously with, after, or in advance of one another as implementations permit. In some implementations, step 1020-1050 may be conducted before the logging run (e.g., prior to conveyance of the tool in the borehole).

Methods may include representing the estimated at least one parameter as a dispersive relation for calculated permittivity values and conductivity values of the formation. The representation may be saved in computer memory, transmitted uphole, or displayed for an operating engineer. The parameter may be a geo-electrical property of the formation. The property may comprise at least one of: i) a frequency dependent conductivity parameter; and ii) a frequency dependent permittivity parameter.

Other, optional, steps may include evaluating the formation or modeling the formation using the parameters of interest, conducting secondary recovery operations in dependence upon the estimated parameters, the model, or combinations of these. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular properties (e.g., values of one or more parameters of interest).

Mathematical models, look-up tables, neural networks, or other models representing relationships between the signals and the values of the formation properties may be used to characterize the drilling operation, optimize one or more drilling parameters of a drilling operation, change direction of drilling, or otherwise modify drilling operations in the borehole. The system may carry out these actions through notifications, advice, and/or intelligent control.

Estimated parameter representations, values and/or models of the formation (or portions thereof) may be stored (recorded) as information or visually depicted on a display. The visual depiction may include a two-dimensional (2D) or three dimensional (3D) graphical depiction of parameter values (although one-dimensional (1D) depictions may also be displayed in some applications). The parameter values or model may be transmitted before or after storage or display, such as, for example, being transmitted uphole (i.e., to the surface or to modules closer to the surface). For example, information may be transmitted to other downhole components, or to the surface for storage, display, or further processing. Aspects of the present disclosure relate to modeling a volume of an earth formation using the geo-electrical parameters, such as, for example, by associating estimated geo-electrical parameters or other parameter values with portions of the volume of interest to which they correspond, or by representing a boundary between areas of representative or statistically similar values along with the formation in a global coordinate system. Aspects include maintaining a model comprising a representation of the earth formation stored as information including a representation of parameter values with respect to location, either as absolute values or variances thereof. The model of the earth formation generated and maintained in aspects of the disclosure may be implemented as a representation of the earth formation stored as information, including a graphic representation of parameter values or variances in elemental concentrations, C/O ratio, water saturation, or other parameters of interest with respect to location, e.g., in 1D, 2D, or 3D. In one example, a model of the earth formation may be maintained in a database. Modeling the earth formation may comprise associating a portion of the formation proximate the borehole with the geo-electrical parameter as estimated herein, to generate or update the model. The information (e.g., data) may also be transmitted, stored on a non-transitory machine-readable medium, and/or rendered (e.g., visually depicted) on a display. Any of rendering the models, the values, or information representing the same may be referred to herein as "displaying a geo-electrical parameter on a display."

An example algorithm of a five-parametric search may include the following steps:
1. Perform measurements with multi-frequency electromagnetic propagation instrument at least at 3 frequencies;
2. Generate a 2-dimensional grid in the selected range of formation resistivities and dielectric constants with the first dimension being a resistivity of the formation and the second dimension being a dielectric constant of the formation;
3. Generate for the selected set of models and set of operating frequencies the lookup table of the synthetic signals of the propagation instrument. The resistivities and dielectric constants of the models may be defined in the nodes of the 2-dimensional grid from step 2;
4. Perform a 2-dimensional interpolation of the synthetic signals from the lookup table from step 3, where the first and second dimension are resistivity and dielectric constant correspondingly;
5. Define linear functions interpolating logarithm of the dispersive resistivity of the formation as functions of a logarithm of the operating frequency with a negative slope. Define quadratic functions interpolating logarithm of the dispersive dielectric constant of the formation as functions of a logarithm of the operating frequency with the vertex of the quadratic functions being the lowest point on the "U"-shape graph and the vertex being greater than maximal operating frequency;
6. Generate a five-dimensional grid in the selected range of the two coefficient parameters describing linear functions and the three coefficient parameters describing quadratic functions from step 5;
7. Perform interpolation of the dispersive resistivity using two parameters, describing linear functions of resistivity from the five-dimensional grid from step 5. Perform interpolation of the dispersive dielectric constant using the three parameters describing quadratic functions of dielectric constant from the five-dimensional grid from step 5;
8. Perform a five-parametric scan over the sets of two resistivity parameters and sets of three dielectric constant parameters using a five-dimensional grid from step 6, along with a two-dimensional interpolation from step 4 to find the combination of five parameters (which describe dispersive resistivity and dielectric constant) that provide the best fit between measured and synthetic data.

As an example, the synthetic data may include phase differences and attenuations at five frequencies and six arrays with spacings ranging from 3 to 12 inches. The data may be calculated for the homogeneous earth model, for example. In Table 1, below, for each frequency the true parameters of the model are presented. An example workflow follows:
1. Initially, 15×15 tables of signals (e.g., n=15) are calculated for the homogeneous earth model. Resistivity ranges from 0.5 to 200 Ohm·m, and permittivity ranges from 1 to 80.
2. Spline coefficients are estimated.
3. Polynomial parameters are chosen. For example, two resistivities at 35 and 1000 MHz along with three permittivities at 35, 200 and 1000 MHz. The grid contains 30 resistivity values and 30 values of permittivity. Dispersive character of the curves may be taken into account.
4. A search for the parameters in 1,230,000 points of the grid is performed.
5. Resistivity and permittivity may be calculated at missing frequencies in each point of the grid using polynomial representation.
6. For the obtained resistivity and permittivity, the signals at all the frequencies and arrays based on two-dimensional spline approximation may be recovered.
7. Misfit is calculated between experimental (measured) and recovered signals.

Minimal misfit (6.9%) at some point of the parameters grid is found. Thus, dispersive curves of resistivity and permittivity are calculated through polynomial parameters corresponding to the minimal misfit ("best fit"). Table 2 shows inverted values of resistivity and permittivity for this example.

TABLE 1

Dispersive resistivity and permittivity of the model.

| | Frequency, MHz | | | | |
| --- | --- | --- | --- | --- | --- |
| | 32.5 | 88.4 | 198 | 425 | 1000 |
| Resistivity, Ohm · m | 40 | 33.4 | 27.9 | 23.6 | 20 |
| Relative permittivity | 30 | 19 | 13.6 | 11.1 | 10 |

TABLE 2

Inverted dispersive resistivity and permittivity.

| | Frequency, MHz | | | | |
| --- | --- | --- | --- | --- | --- |
| | 32.5 | 88.4 | 198 | 425 | 1000 |
| Resistivity, Ohm · m | 38.30 | 32.58 | 27.75 | 23.89 | 20.61 |
| Relative permittivity | 30.97 | 19.20 | 13.50 | 11.01 | 9.719 |

Figure 11A:
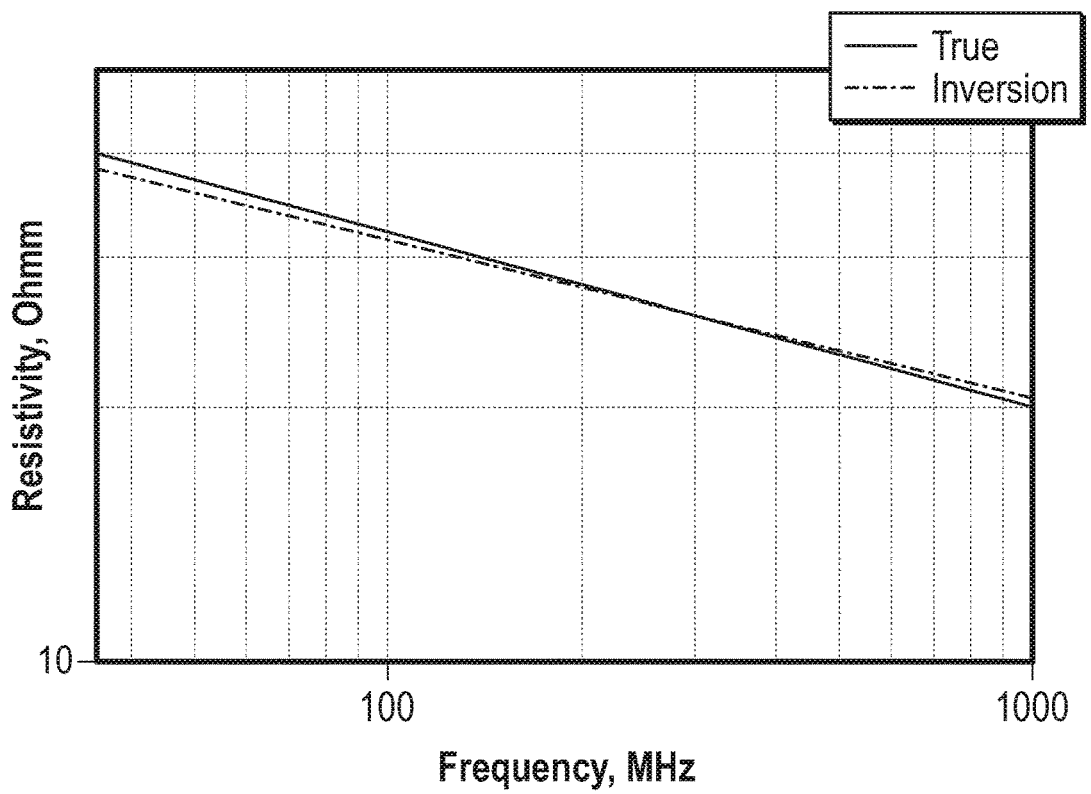
FIGS. 11A & 11B show the comparison between dispersive model curves and inverted dispersion curves in accordance with embodiments of the present disclosure.
Figure 11B:
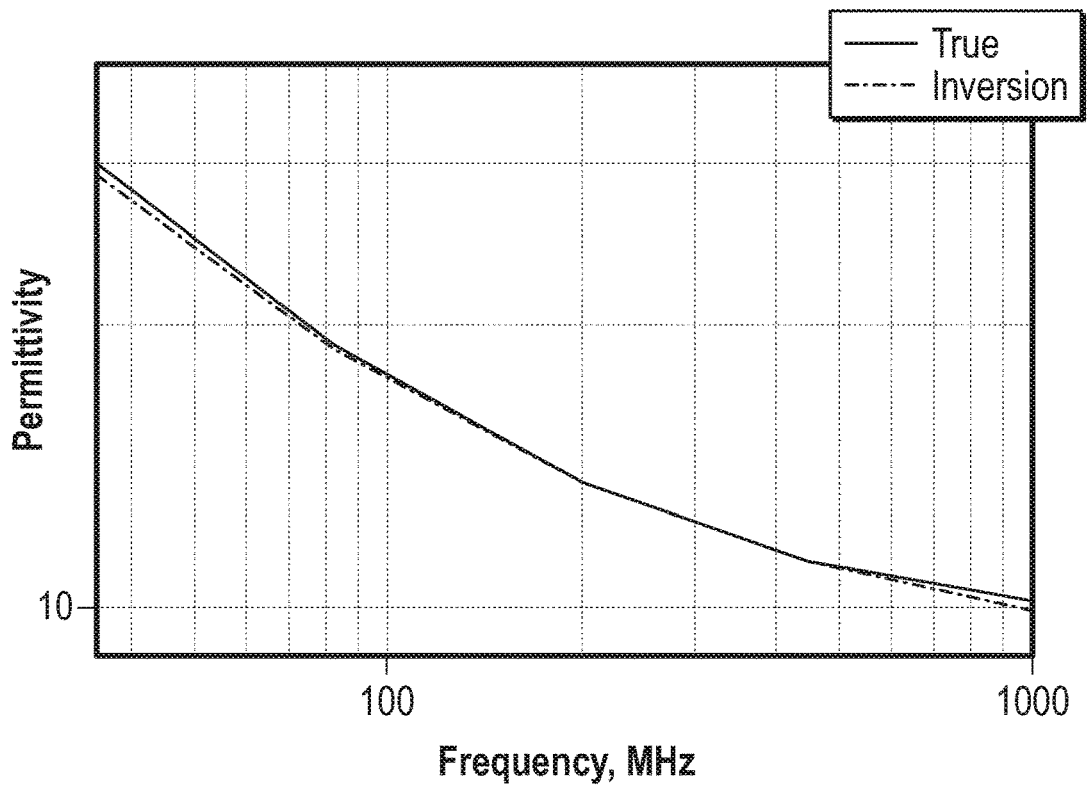

FIGS. 11A & 11B show the comparison between dispersive model curves and inverted dispersion curves in accordance with embodiments of the present disclosure. It is apparent that the inverted and model curves are in good agreement. The mismatch is due to the size of the discrete steps for both resistivity and used to perform scanning, and may be reduced with reduced size of the step.

Figure 12A:
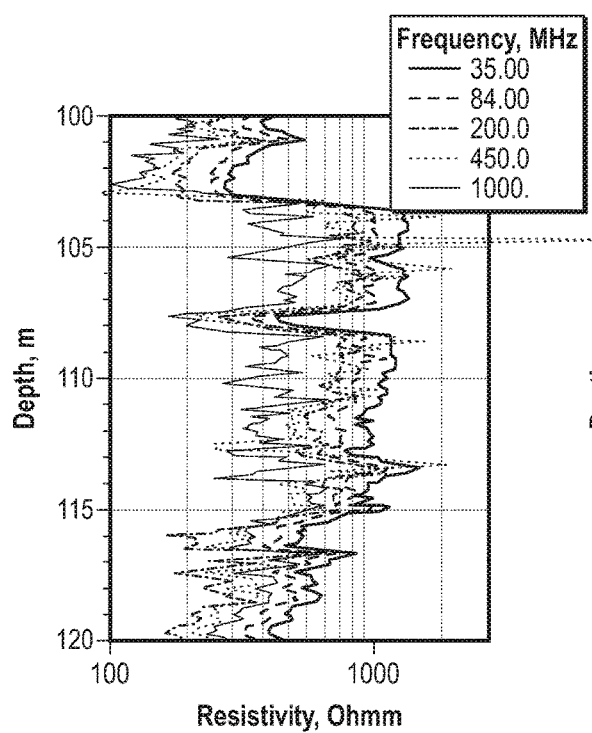
FIGS. 12A & 12B illustrate effects of the polynomial techniques in accordance with embodiments of the present disclosure.
Figure 12B:
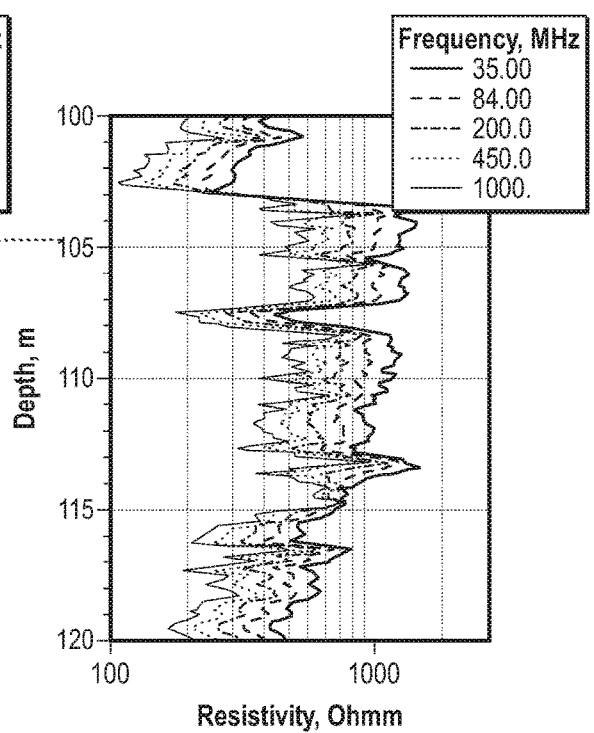

FIGS. 12A & 12B and 13A & 13B illustrate effects of the polynomial techniques in accordance with embodiments of the present disclosure. FIGS. 12A & 12B show resistivity with respect to depth for several frequencies. Referring to FIG. 12A, a first frequency curve 1201 represents the resistivity with respect to depth at 32.5 MHz. A second frequency curve 1202 represents the resistivity with respect to depth at 88.4 MHz. A third frequency curve 1203 represents the resistivity with respect to depth at 198 MHz. A fourth frequency curve 1204 represents the resistivity with respect to depth at 425 MHz. A fifth frequency curve 1205 represents the resistivity with respect to depth at 1000 MHz (1 GHz).

Referring to FIG. 12B, a first frequency curve 1211 represents the resistivity with respect to depth at 32.5 MHz. A second frequency curve 1212 represents the resistivity with respect to depth at 88.4 MHz. A third frequency curve 1213 represents the resistivity with respect to depth at 198 MHz. A fourth frequency curve 1214 represents the resistivity with respect to depth at 425 MHz. A fifth frequency curve 1215 represents the resistivity with respect to depth at 1000 MHz (1 GHz).

FIGS. 13A & 13B show permittivity with respect to depth for several frequencies. Referring to FIG. 13A, a first frequency curve 1301 represents the permittivity with respect to depth at 32.5 MHz. A second frequency curve 1303 represents the permittivity with respect to depth at 88.4 MHz. A third frequency curve 1303 represents the permittivity with respect to depth at 198 MHz. A fourth frequency curve 1304 represents the permittivity with respect to depth at 425 MHz. A fifth frequency curve 1305 represents the permittivity with respect to depth at 1000 MHz (1 GHz).

Referring to FIG. 13B, a first frequency curve 1311 represents the permittivity with respect to depth at 32.5 MHz. A second frequency curve 1313 represents the permittivity with respect to depth at 88.4 MHz. A third frequency curve 1313 represents the permittivity with respect to depth at 198 MHz. A fourth frequency curve 1314 represents the permittivity with respect to depth at 425 MHz. A fifth frequency curve 1315 represents the permittivity with respect to depth at 1000 MHz (1 GHz).

As shown, polynomial corrections rearrange dispersive dielectric constant and resistivity into the "correct" sequences, where dielectric constant and resistivity each reduce with the frequency. The uncorrected data are presented in FIGS. 12A & 13A, while corrected data is reflected in FIGS. 12B & 13B.

Methods for evaluation of core samples from a wellbore for geophysical parameters of interest are well known. For example, these techniques may utilize the natural radioactivity of the core sample, the absorption of a known radiation emitted by a known source arranged in proximity to the core sample, and the value of the liquid saturation of the core sample (which may be measured by induction). Techniques for dielectric and resistivity measurement of core samples is also well known. The core sample may be retrieved to the surface and various tests made on the sample in a laboratory. The test results may suggest certain drilling procedures including whether further drilling should be conducted, and also suggest implementation of completion techniques. Embodiments of the invention may include placing a cylindrical core sample from a formation of interest in a first cavity at a specified temperature and pressure; positioning along a cylindrical wave guide (i) a transmitter coil for forming an electromagnetic wave in the wave guide, (ii) a first receiver coil spaced along the wave guide from the transmitter coil; (iii) a second receiver coil spaced along the wave guide from the transmitter coil, wherein the first receiver coil and transmitter coil define a first cavity, and wherein the second receiver coil is spaced oppositely the first receiver coil and defines a second cavity opposite the first cavity; transmitting a signal from the transmitter coil along the wave guide; forming first and second received signals at the first and second receiver coils; and responding to the first and second received signals to encode a dielectric measurement in the signal as a function of materials in the cavities; as described in U.S. Pat. No. 4,996,489 to Sinclair, incorporated herein by reference in its entirety. Other embodiments may use electrical contacts, as described in U.S. Pat. No. 3,774,237 to Hardway. Alternative techniques are described by Fuller & Ward, IEEE Transactions on Geoscience Electronics, Vol. GE 8, No. 1, January 1970, and at Rau & Wharton, Journal of Petroleum Technology, November 1982, pages 2689-2700.

Core samples may also be examined in-situ. For example, dielectric constant and resistivity of fluids or solids in a cylindrical enclosure may be measured to determine well core characteristics in-situ or in a laboratory. Embodiments of the invention may use waves propagated from transmitters above and below two spaced receivers which transmit and receive electromagnetic waves via slots on the inner periphery of a cylinder structure, as described in U.S. Pat. No. 6,788,066 to Wisler et al, incorporated herein by reference in its entirety. The data may be processed with a CPU either down hole or on the surface for real-time monitoring. Techniques for determining geo-electrical parameters as described herein may also be applied to determining parameters of interest of core samples.

Dispersion of the formation resistivity and dielectric constant may also be taken into account when inverting signals of any other induction tool with several working frequencies; it enables extraction of petro-physical characteristics of the formation using one of the mixing laws, as described above (e.g., CRIM, Archie's). After establishing the polynomials describing complex permittivity in a given frequency range, the proposed parametric inversion may be performed to calculate coefficients describing dispersive resistivity and dielectric constant. Linear and/or quadratic functions may be used to interpolate resistivity and dielectric constant values depending on frequency, although other methods may be better suited to particular applications, as would occur to those of skill in the art. For frequencies where the influence of dielectric constant on measured signals is insignificant, dispersive resistivity may be recovered in isolation using the same parametric approach.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors. "Tubular," as used herein, means one or more segments of tubular, including, for example, drill pipe, drill collar, mandrel and so on.

Implicit in the processing of data is the use of a computer program implemented on a suitable non-transitory machine-readable medium (non-transitory computer-readable medium) that enables the processor to perform the control and processing. The non-transitory machine-readable medium may include ROMs, EPROMs, EAROMs, Flash Memories, Optical disks, and Hard disks. As noted above, the processing may be done downhole or at the surface, by using one or more processors. In addition, results of the processing, such as an image of a resistivity property or permittivity, can be stored on a suitable medium.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information 450. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof. In several non-limiting aspects of the disclosure, an information processing device includes a computer that executes programmed instructions for performing various methods. Herein, the term "information" may include one or more of: raw data, processed data, and signals.

As described herein, "complex permittivity" refers to a permittivity having a real part, which is commonly called the dielectric constant, and an imaginary part, which is commonly called the dielectric loss factor or loss tangent.

The term "mixing model" refers a quantitatively expressed relation between the dielectric behavior of a mixture and the properties of its constituents. More specifically, in the context of the present disclosure, these constituents refer to the rock matrix of the formation and the water and hydrocarbon within. The relation may include details such as the volume fraction of each of these phases, their geometry and distribution within a representative volume of the formation. Forward modeling, as used herein, refers to the technique of determining what a given sensor would measure in a formation with given gross electrical properties by applying a set of theoretical equations for the sensor response.

Estimated parameters of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements by a processor may occur at the tool, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

What is claimed is:

1. A method of determining geo-electrical parameters of an earth formation the method comprising:
   (a) operating a multi-frequency electromagnetic propagation instrument at at least three frequencies by energizing at least one transmitter of the instrument to induce currents in the formation, the formation possessing dispersive resistivity and dispersive dielectric constant, and receiving electromagnetic signals induced by the formation;
   (b) generating a 2-dimensional grid of a plurality of values of formation resistivity in a first selected range and a plurality of values of dielectric constant in a second selected range, with the first dimension of the grid being a resistivity of the formation and the second dimension of the grid being a dielectric constant of the formation;
   (c) using at least one computing unit to:
      i. generate a lookup table of synthetic signals of the propagation instrument for a set of models whose formation resistivities and dielectric constants are defined in nodes of said 2-dimensional grid and a set of operating frequencies; and
      ii. perform a 2-dimensional interpolation of the synthetic signals from the lookup table, where the first dimension is resistivity and the second dimension is dielectric constant;
   (d) defining first polynomial functions interpolating a logarithm of the dispersive resistivity of the formation and second polynomial functions interpolating a logarithm of the dispersive dielectric constant of the formation;
   (e) generating a multi-dimensional grid comprising a first number of first polynomial coefficients of said first polynomial functions and a second number of second polynomial coefficients of said second polynomial functions;
   (f) using said first polynomial functions to perform interpolation of the dispersive resistivity using the first number of first polynomial coefficients describing resistivity values from the said multi-dimensional grid;
   (g) using said second polynomial functions to perform interpolation of the dispersive dielectric constant using the second number of second polynomial coefficients from said multi-dimensional grid; and
   (h) performing a multi-parametric scan over the sets of at least 2 resistivity parameters and sets of at least 3 dielectric constant parameters using the multi-dimensional grid, 2-dimensional interpolation, first polynomial functions, and second polynomial functions to find a combination of first polynomial coefficients and second polynomial coefficients which describe dispersive resistivity and dielectric constant providing a best fit between measured and synthetic data.

2. The method of claim 1 wherein the first polynomial functions are linear functions, the second polynomial functions are quadratic functions, the first number is 2, the second number is 3, and the multi-dimensional grid is a 5-dimensional grid.

3. The method of claim 1 comprising using the combination to estimate a property of the formation.

4. The method of claim 3 wherein the property comprises at least one of: i) a frequency dependent conductivity parameter; and ii) a frequency dependent permittivity parameter.

5. The method of claim 1 wherein the set of models comprise non-petrophysical models.

6. The method of claim 1 wherein defining first polynomial functions interpolating a logarithm of the dispersive resistivity of the formation comprises interpolating logarithms of the dispersive resistivity as a function of a logarithm of the operating frequency with a negative slope; and defining second polynomial functions interpolating a logarithm of the dispersive dielectric constant of the formation comprises interpolating logarithm of the dispersive dielectric constant as a function of a logarithm of the operating frequency with the vertex of the quadratic functions being the lowest point on a U-shape graph and the vertex of the quadratic functions being greater than maximal operating frequency.

7. The method of claim 1 comprising using the combination to estimate at least one geo-electrical parameter of the formation.

8. The method of claim 1 further comprising conducting further operations in dependence upon the at least one geo-electrical parameter.

9. The method of claim 8 wherein the further operations comprise at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

10. The method of claim 1 comprising representing the estimated at least one geo-electric parameter as a dispersive relation for calculated permittivity values and conductivity values of the formation.

11. An apparatus configured for determining geo-electrical parameters of an earth formation the apparatus comprising:
   a carrier (11) configured for conveyance in a borehole (12) and having disposed thereon a multi-frequency electromagnetic propagation instrument (201, 300) with at least one transmitter (T1, T2) and at least one receiver (R1, R2); and
   at least one computing unit (15, 20, 29), including at least one processor (17), configured for:
   (a) operating the multi-frequency electromagnetic propagation instrument at at least three frequencies by energizing the at least one transmitter of the instrument to induce currents in the formation, the formation possessing dispersive resistivity and dispersive dielectric constant, and receiving electromagnetic signals induced by the formation;
   (b) generating a 2-dimensional grid of a plurality of values of formation resistivity in a first selected range and a plurality of values of dielectric constant in a second selected range, with the first dimension of the grid being a resistivity of the formation and the second dimension of the grid being a dielectric constant of the formation;
   (c) using at least one computing unit to:
      i. generate a lookup table of synthetic signals of the propagation instrument for a set of models whose formation resistivities and dielectric constants are defined in nodes of said 2-dimensional grid and a set of operating frequencies; and ii. perform a 2-dimensional interpolation of the synthetic signals from the lookup table, where the first dimension is resistivity and the second dimension is dielectric constant;

(d) defining first polynomial functions interpolating a logarithm of the dispersive resistivity of the formation and second polynomial functions interpolating a logarithm of the dispersive dielectric constant of the formation;

(e) generating a multi-dimensional grid comprising a first number of first polynomial coefficients of said first polynomial functions and a second number of second polynomial coefficients of said second polynomial functions;

(f) using said first polynomial functions to perform interpolation of the dispersive resistivity using the first number of first polynomial coefficients describing resistivity values from said multi-dimensional grid;

(g) using said second polynomial functions to perform interpolation of the dispersive dielectric constant using the second number of second polynomial coefficients from said multi-dimensional grid; and (h) performing a multi-parametric scan over the sets of at least 2 resistivity parameters and sets of at least 3 dielectric constant parameters using the multi-dimensional grid, 2-dimensional interpolation, first polynomial functions, and second polynomial functions to find a combination of first polynomial coefficients and second polynomial coefficients which describe dispersive resistivity and dielectric constant providing a best fit between measured and synthetic data.

12. The apparatus of claim 11 wherein the carrier comprises a core bit configured to separate a sample portion of the formation from a remaining portion of the formation, and wherein the multi-frequency electromagnetic propagation instrument is configured to measure the sample portion of the formation.

13. A method of determining geological parameters of earth formation material, the method comprising:

(a) operating a multi-frequency electromagnetic propagation instrument at at least three frequencies by energizing at least one transmitter of the instrument to induce currents in the material, the material possessing dispersive resistivity and dispersive dielectric constant, and receiving electromagnetic signals induced by the material;

(b) generating a 2-dimensional grid of a plurality of values of material resistivity in a first selected range and a plurality of values of dielectric constant in a second selected range, with the first dimension of the grid being a resistivity of the material and the second dimension of the grid being a dielectric constant of the material;

(c) using at least one computing unit to:
i. generate a lookup table of synthetic signals of the propagation instrument for a set of models whose formation resistivities and dielectric constants are defined in nodes of said 2-dimensional grid and a set of operating frequencies; and
ii. perform a 2-dimensional interpolation of the synthetic signals from the lookup table, where the first dimension is resistivity and the second dimension is dielectric constant;

(d) defining first polynomial functions interpolating a logarithm of the dispersive resistivity of the material and second polynomial functions interpolating a logarithm of the dispersive dielectric constant of the material;

(e) generating a multi-dimensional grid comprising a first number of first polynomial coefficients of said first polynomial functions and a second number of second polynomial coefficients of said second polynomial functions;

(f) using said first polynomial functions to perform interpolation of the dispersive resistivity using the first number of first polynomial coefficients describing resistivity values from the said multi-dimensional grid;

(g) using said second polynomial functions to perform interpolation of the dispersive dielectric constant using the second number of second polynomial coefficients from said multi-dimensional grid; and (h) performing a multi-parametric scan over the sets of at least 2 resistivity parameters and sets of at least 3 dielectric constant parameters using the multi-dimensional grid, 2-dimensional interpolation, first polynomial functions, and second polynomial functions to find a combination of first polynomial coefficients and second polynomial coefficients which describe dispersive resistivity and dielectric constant providing a best fit between measured and synthetic data.

14. The method of claim 13 wherein the material comprises a volume of interest of the earth formation.

15. The method of claim 13 wherein the material comprises a core sample of the earth formation.

16. The method of claim 15 further comprising estimating a parameter of interest of the earth formation in dependence upon the geo-electrical parameter.

17. The method of claim 15 wherein operating the multi-frequency electromagnetic propagation instrument is conducted in the formation.

18. The method of claim 15 wherein operating the multi-frequency electromagnetic propagation instrument is conducted at a surface location of the earth.

19. The method of claim 13 wherein the material comprises a fluid-saturated rock matrix.

* * * * *